United States Patent
Yoshida

(10) Patent No.: US 6,519,247 B1
(45) Date of Patent: Feb. 11, 2003

(54) DATA COMMUNICATING APPARATUS AND DATA COMMUNICATING METHOD CAPABLE OF COMMUNICATING THROUGH A PLURALITY OF KINDS OF NETWORKS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/997,789

(22) Filed: Dec. 24, 1997

(30) Foreign Application Priority Data

Dec. 26, 1996 (JP) .............................................. 8-357397

(51) Int. Cl.$^7$ ............................................. H04L 12/66
(52) U.S. Cl. ..................................................... 370/352
(58) Field of Search ................................ 370/352, 354, 370/355, 356, 401, 428, 465; 358/434, 440, 402

(56) References Cited

U.S. PATENT DOCUMENTS

| | | | | |
|---|---|---|---|---|
| 5,369,686 A | * | 11/1994 | Dutra et al. .................. 379/94 |
| 5,521,719 A | * | 5/1996 | Yamada ....................... 358/438 |
| 5,555,100 A | * | 9/1996 | Bloomfield et al. ......... 358/402 |
| 5,610,910 A | * | 3/1997 | Focsaneanu et al. ........ 370/351 |
| 5,872,845 A | * | 2/1999 | Feder ............................ 380/18 |
| 5,923,659 A | * | 7/1999 | Curry et al. ................. 370/401 |
| 5,930,250 A | * | 7/1999 | Klok et al. .................. 370/352 |
| 5,949,861 A | * | 9/1999 | Chan et al. ............. 379/100.17 |
| 5,953,319 A | * | 9/1999 | Dutta et al. ................. 370/238 |
| 5,974,043 A | * | 10/1999 | Solomon ..................... 370/352 |
| 5,991,290 A | * | 11/1999 | Malik ......................... 370/352 |
| 6,023,345 A | * | 2/2000 | Bloomfield ................. 358/402 |
| 6,052,372 A | * | 4/2000 | Gittins et al. ............... 370/396 |
| 6,064,653 A | * | 5/2000 | Farris ......................... 370/237 |
| 6,069,890 A | * | 5/2000 | White et al. ................ 370/352 |

* cited by examiner

Primary Examiner—Mark Zimmerman
Assistant Examiner—Enrique L Santiago
(74) Attorney, Agent, or Firm—Fitzpatrick, Cella, Harper & Scinto

(57) ABSTRACT

According to the invention, in an apparatus which can perform a data communication through a plurality of networks such as internet, public telephone network, and the like, an optimum network to perform the data communication is automatically selected in accordance with communicating conditions such as a communicating mode and the like, thereby enabling a data communication via the selected optimum network to be executed.

18 Claims, 17 Drawing Sheets

DATA COMMUNICATING APPARATUS AND DATA COMMUNICATING METHOD CAPABLE OF COMMUNICATING THROUGH A PLURALITY OF KINDS OF NETWORKS

BACKGROUND OF THE INVENTION

1. Field of the Invention

The invention relates to a data communicating apparatus and a data communicating method which can communicate through a plurality of kinds of networks.

2. Related Background Art

Hitherto, a facsimile apparatus communicates image data through a public switched telephone network (PSTN).

In a computer communication, various data communications of voice, data, image, and the like through the internet are executed.

In recent years, what is called an internet facsimile for performing a facsimile communication through the internet has been proposed. The internet facsimile converts facsimile information to a format (for example, TIFF) of an annexed file of an electronic mail. The converted data is communicated as electronic mail data through the internet. The communication of the facsimile information through the internet has an advantage such that communication costs are cheap.

In case of the transmission by an electronic mail, however, even if a transmitting process is performed at a terminal on the transmitting side, whether the electronic mail has actually correctly reached the partner destination or not is obscure. If the electronic mail does not reach the communication partner, a notification that the electronic mail did not reach is sent after a little while after completion of the transmitting process. There is, consequently, a case where even if the operator on the transmitting source side performed the transmitting process of the electronic mail, the electronic mail does not actually correctly reach the partner destination.

On the other hand, although the conventional facsimile communication through the PSTN have higher communication costs than those of the communication of the facsimile information through the internet mentioned above, it has an advantage such that whether the facsimile information could certainly be transmitted to the communication partner destination or not can be immediately performed as compared with the communication of the electronic mail through the internet mentioned above.

SUMMARY OF THE INVENTION

By paying attention to the foregoing points, it is an object of the invention to provide a data communicating apparatus which can perform a data communication by properly selectively using a plurality of kinds of networks, for example, the internet and the public swicthed telephone network.

Another object of the invention is to provide a data communicating apparatus in which in the case where instantaneousness is required in a data transmission to a partner destination, data is transmitted through a network suitable for the instantaneousness and, on the other hand, when instantaneousness of the data transmission is not so important, the data is transmitted through a network of cheap communication costs.

The other objects of the present invention will become apparent from the following detailed description of the preferred embodiments and the accompanying drawings.

DETAILED DESCRIPTION OF THE PREFERRED EMBODIMENTS

Embodiments of the present invention will now be described in detail hereinbelow with reference to the drawings.

In the following embodiments, a facsimile apparatus which can communicate image data through the internet and a general public telephone network such as PSTN or a public digital network such as ISDN will be explained as an example of a data communicating apparatus.

Figure 1:
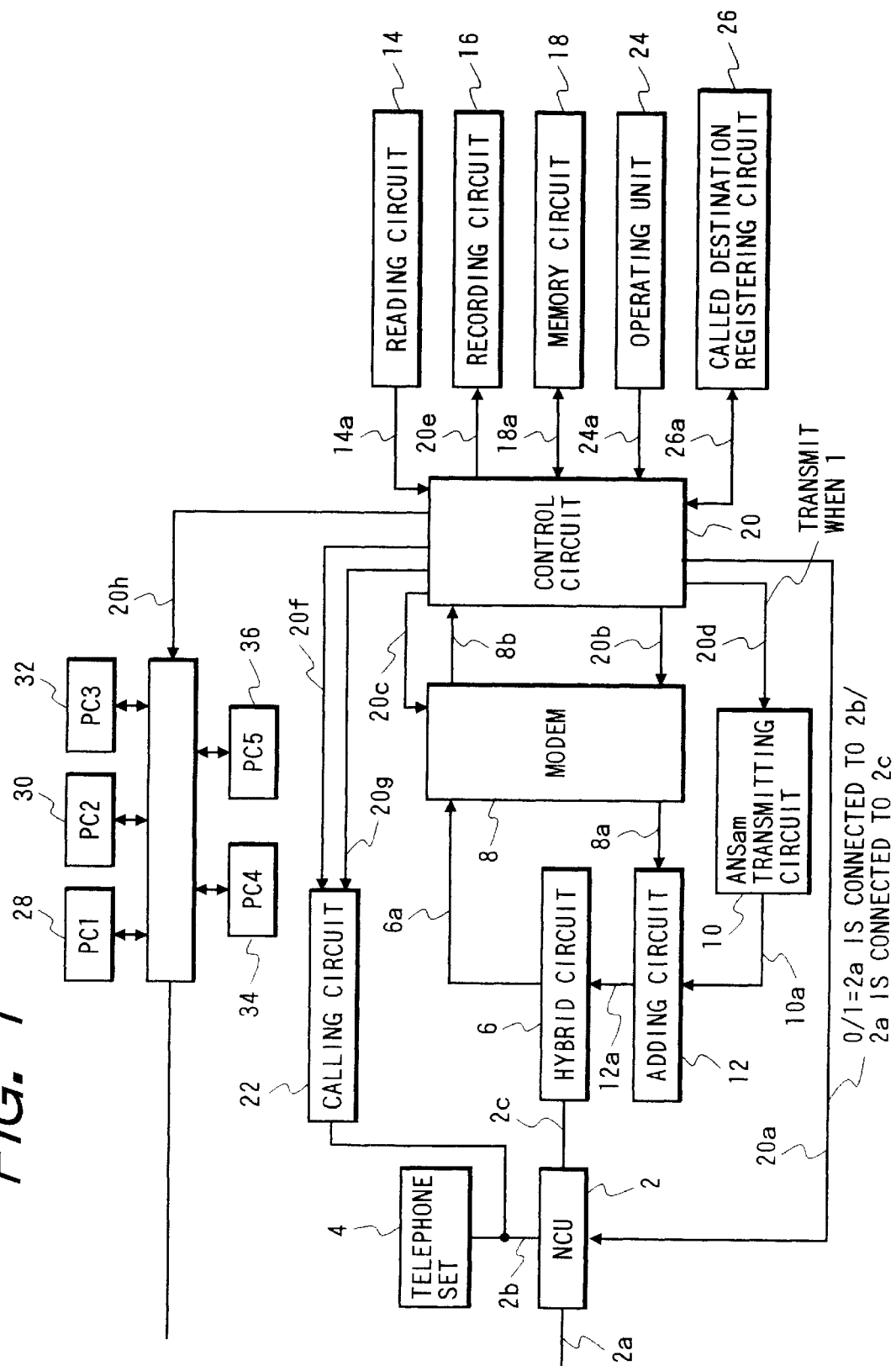
FIG. 1 is a block diagram showing a construction of a data communicating apparatus (facsimile apparatus) according to each of the first to third embodiments of the invention.

FIG. 1 is a block diagram showing a construction of a facsimile apparatus according to each of the first to third embodiments of the invention.

An NCU (network control unit) 2 connects a telephone network to a terminal on a line of this network in order to use the telephone network for a data communication or the like, performs a connection control of a telephone exchange network, performs a switching to a data communication path, and holds a loop. When the signal level (signal line 20a) from a control circuit 20 is equal to "0", the NCU 2 connects a telephone line 2a to a telephone set 4 side. When the signal level is equal to "1", the NCU 2 connects the telephone line 2a to a facsimile apparatus side. In an ordinary state, the telephone line 2a is connected to the telephone set 4 side.

A hybrid circuit 6 separates a signal of a transmission system and a signal of a reception system, sends a transmission signal from an adding circuit 12 to the telephone line 2a via the NCU 2, receives a signal from the partner side via the NCU 2, and transmits it to a modulator/demodulator (MODEM) 8 via a signal line 6a.

The MODEM 8 executes a modulation and a demodulation based on the ITU-T recommendation V.8, V.21, V.27ter, V.29, V.17, and V.34. Each transmitting mode is designated for the MODEM 8 by a signal line 20c. The MODEM 8 inputs a signal outputted to a signal line 20b, outputs modulation data to a signal line 8a, inputs a reception signal outputted to the signal line 6a, and outputs demodulation data to a signal line 8b.

An ANSam transmitting circuit 10 is a circuit for transmitting an ANSam signal (modulated tone signal based on the V.8 recommendation). When a signal at the signal level "1" is outputted to a signal line 20d, the ANSam transmitting circuit 10 sends the ANSam signal to a signal line 10a. When the signal at the signal level "0" is outputted to the signal line 20d, the ANSam transmitting circuit 10 outputs no signal to the signal line 10a.

The adding circuit 12 receives information on the signal line 8a and information on the signal line 10a and outputs an addition result to a signal line 12a. A reading circuit 14 reads an image of an original and outputs the read image data to a signal line 14a. A recording circuit 16 sequentially records information outputted to a signal line 20e every line.

A memory circuit 18 is used to store original information or encoded information of the read data or to store received information, decoded information, or the like.

When a calling command pulse is generated onto a signal line 20g, a calling circuit (or dialing circuit) 22 inputs telephone number information outputted to a signal line 20f and outputs it to a signal line 2b.

An operating unit 24 has a one-touch dial, an abbreviation dial, a ten-key, *, •, # keys, a set key, an @ key, a start key, a registration key to a called destination registering circuit 26, a key to select a mode for a quick transmission, and other function keys. Information corresponding to the depressed key is outputted to a signal line 24a.

The circuit 26 is a circuit for registering a destination using the internet and a destination using a public communication network through a signal line 26a in correspondence to each destination of the one-touch dial or the abbreviation dial.

Personal computers (PCs) 28, 30, 32, 34, and 36 are connected to the LAN through a signal line 20h. The signal line 20h is connected to a network of the internet.

In the first embodiment of the invention, when the communication is selected, the control circuit 20 performs a control in a manner such that the communication through the internet is tried a predetermined number of times (3 times) and, when the communication is not established even if the communication was tried over the predetermined number of times, the communication using the telephone network is tried the maximum predetermined number of times (3 times). The control circuit 20 also performs a control in a manner such that after the communication through the internet was executed, if an acknowledgment of the reception cannot be obtained within five minutes, the communication via the internet is again started and, if a partner destination uses the telephone network and is busy or an error occurs during the communication, a call is generated to the same destination two minutes later by using the telephone network. Further, when the communication is established by the above controls, it is discriminated that the communication was finished.

FIGS. 2 to 5 are flowcharts showing the operation of the control circuit 20 in the first embodiment of the invention.

Figure 2:
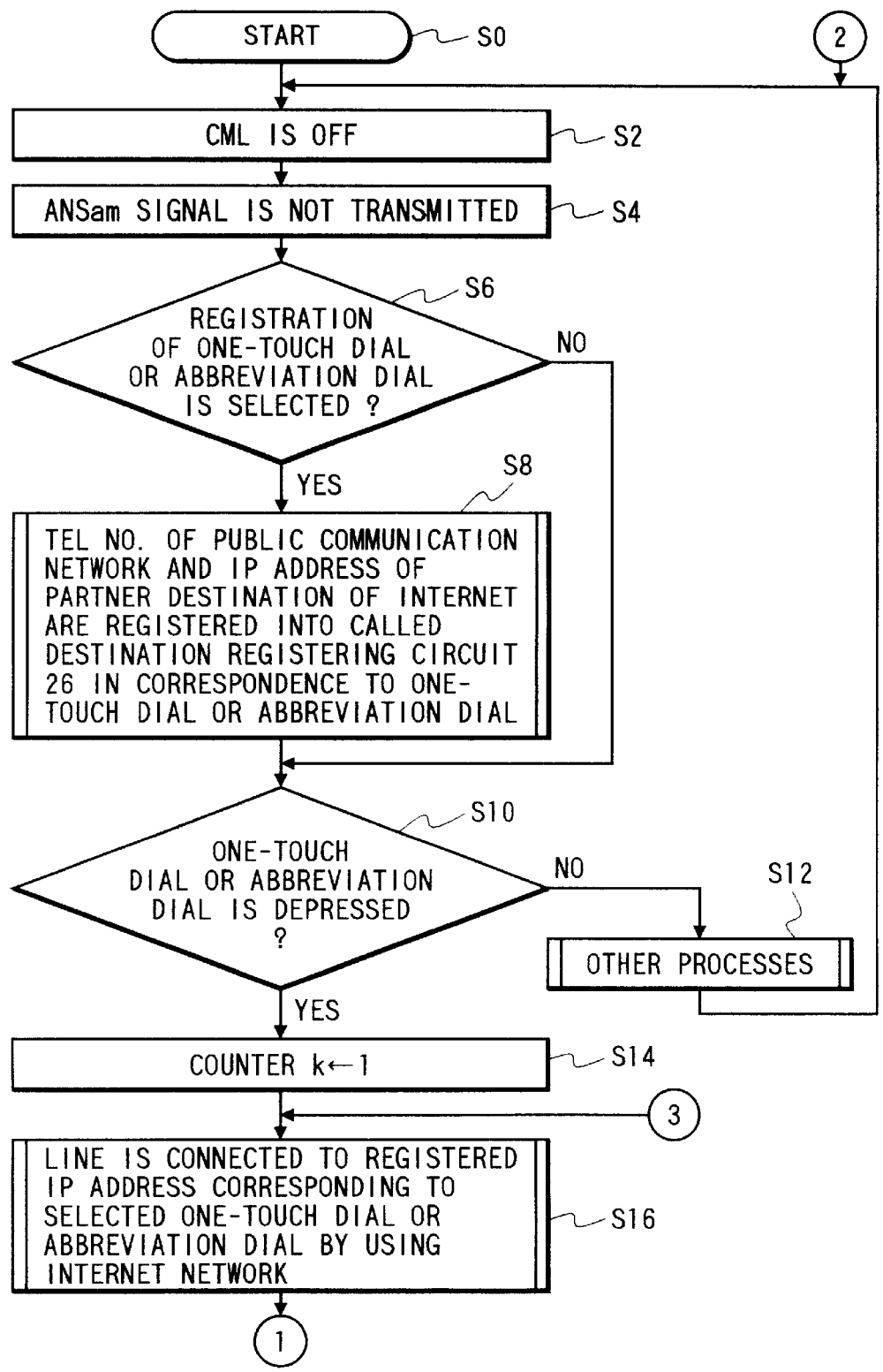
FIG. 2 is a flowchart showing the control operation in the first embodiment.
Figure 3:
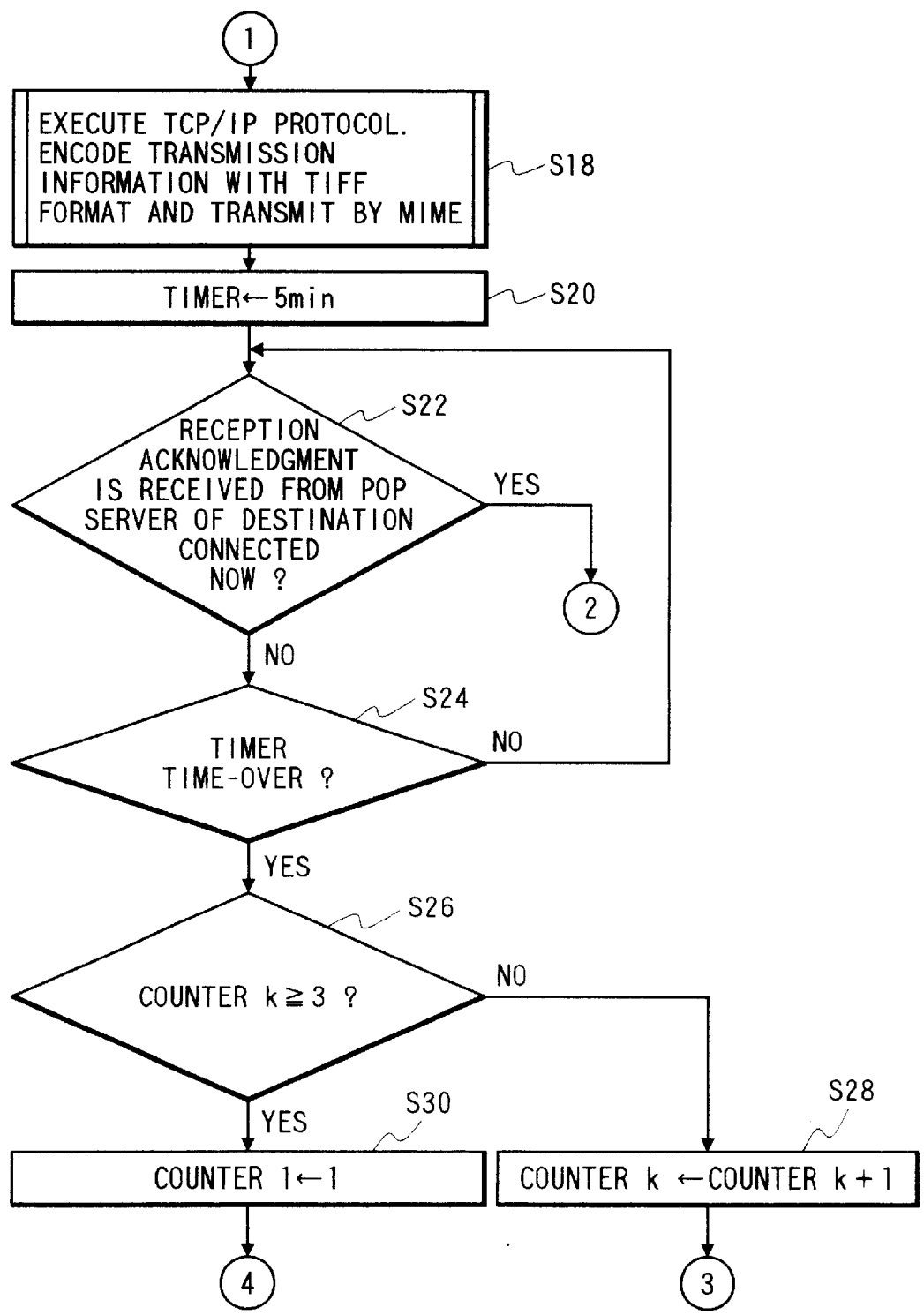
FIG. 3 is a flowchart showing the control operation in the first embodiment.
Figure 4:
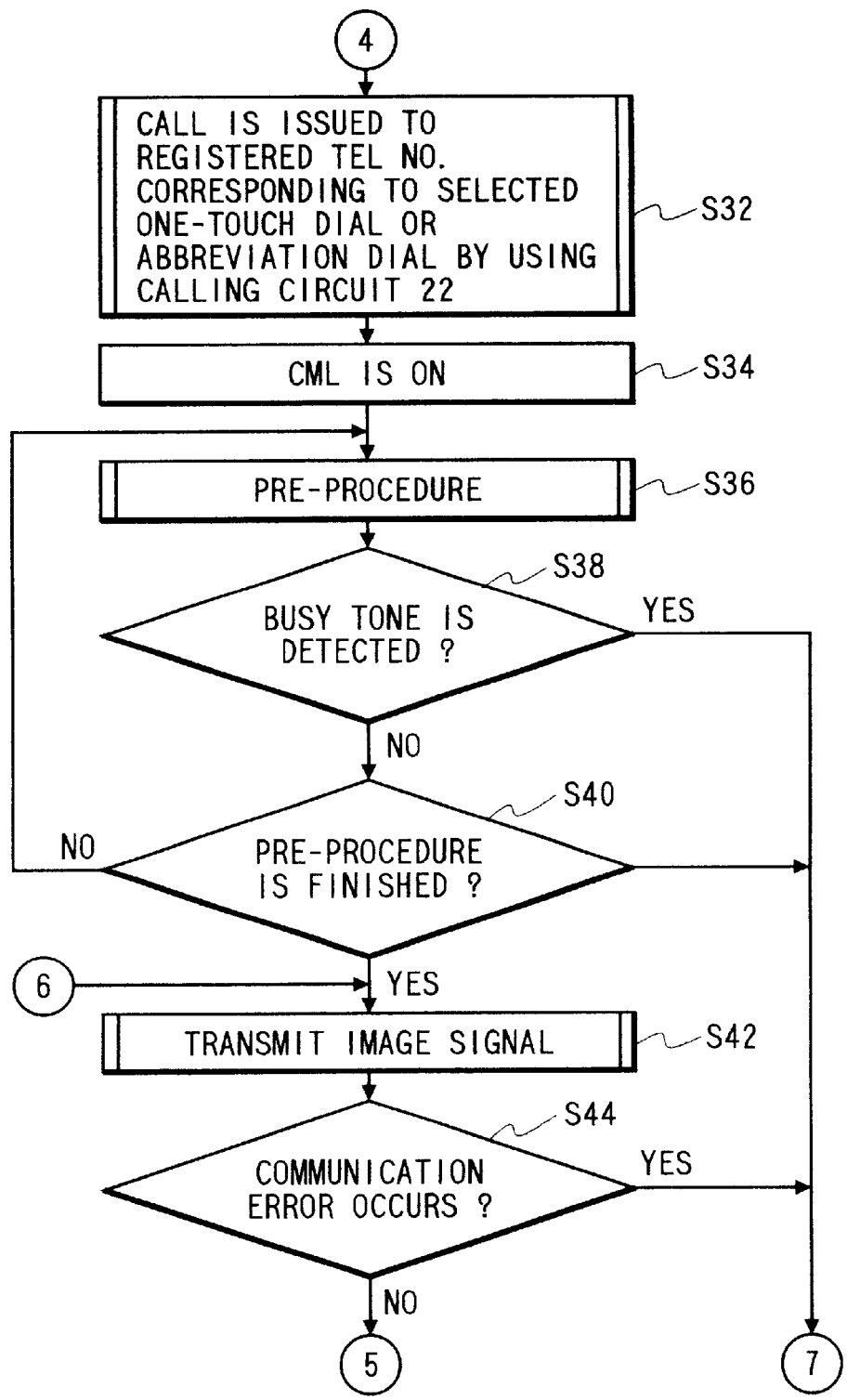
FIG. 4 is a flowchart showing the control operation in the first embodiment.
Figure 5:
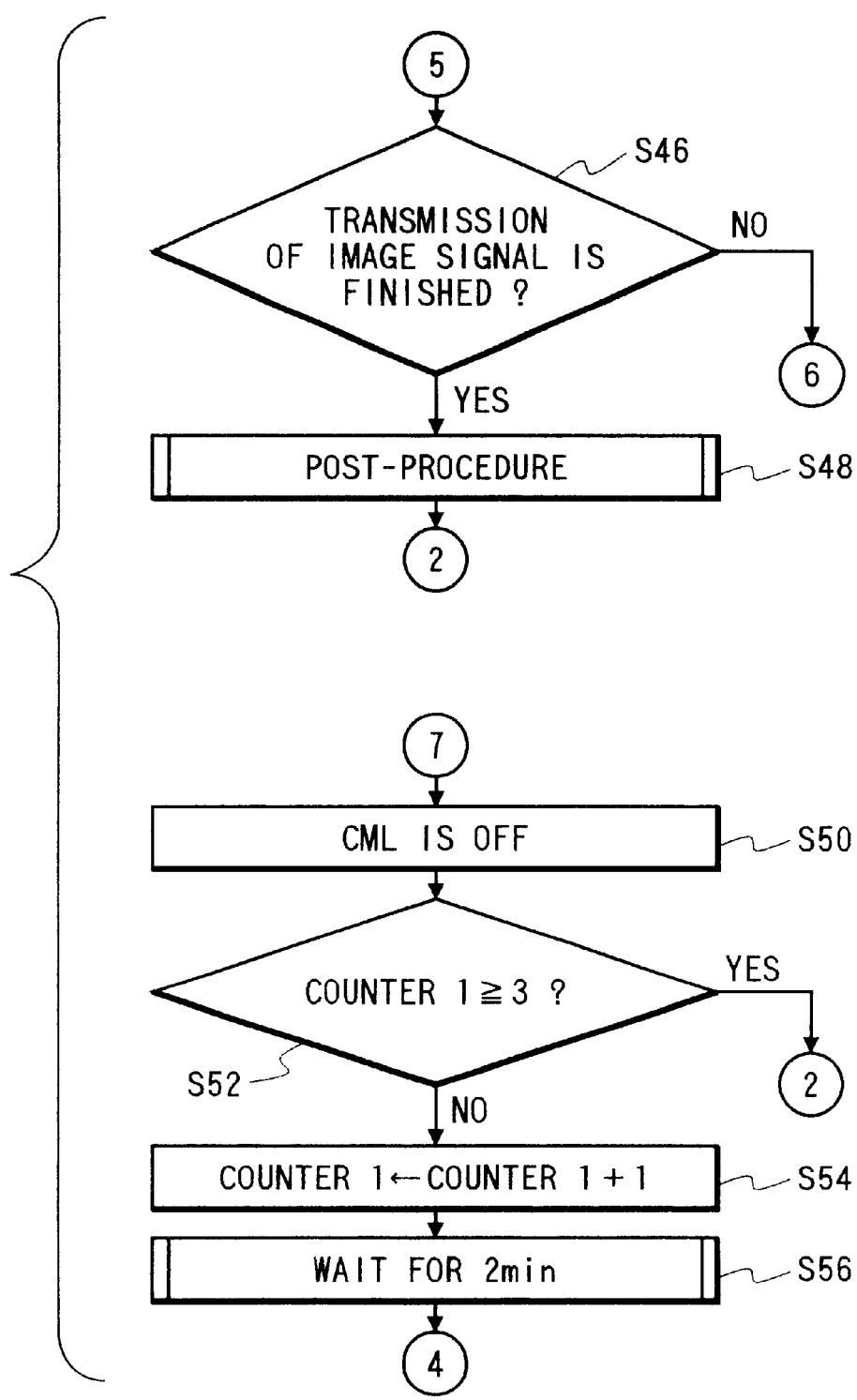
FIG. 5 is a flowchart showing the control operation in the first embodiment.

In FIG. 2, the operation is first started in step S0. In step S2, the signal at the signal level "0" is outputted to the signal line 20a and a CML relay of the NCU 2 is turned off. In step S4, the signal at the signal level "0" is outputted to the signal line 20d, thereby setting the apparatus into a state where the ANSam signal is not transmitted.

In step S6, the information on the signal line 24a is inputted and a check is made to see if the registration of the one-touch dial or the abbreviation dial has been selected. If it is selected, step S8 follows. If NO, step S10 follows.

In step S8, a telephone number of the telephone network and an IP (Internet Protocol) address of the partner destination of the internet are registered to the called destination registering circuit 26 through the signal line 26a in correspondence to the one-touch dial or the abbreviation dial. After that, the processing routine advances to step S10.

In step S10, a check is made to see if the one-touch dial or the abbreviation dial has been depressed. When it is not depressed, step S12 follows and the other process is executed.

When it is depressed, step S14 follows and "1" is set in a counter (K) for counting the number of times of communication using the internet.

In step S16, the line is connected to the IP address registered in correspondence to the selected one-touch dial or the abbreviation dial by using the internet network. In step S18, a TCP/IP protocol is executed. Information to be transmitted is encoded according to the TIFF (tag image file format) format and is transmitted according to the MIME (multipurpose internet mail extensions).

In step S20, when the reception cannot be confirmed from the partner side after completion of the end of the communication by the internet, a time of five minutes is set in a timer as a time that is required to retry the communication by the internet.

In step S22, a check is made to see if the information of the reception confirmation has been received from a POP server of the destination connected just now. When it is an acknowledgment response, this means that the internet communication has been established. Therefore, the processing routine advances to step S2. When it is a negative response, step S24 follows.

In step S24, a check is made to see if the timer has timed over. When it times over, step S26 follows. If NO, step S22 follows.

In step S26, a check is made to see whether the count value of the counter K is equal to or larger than 3 or not. When it is smaller than 3, step S28 follows. The value of the counter K is increased by "1" and the internet communication is retried. When it is equal to or larger than 3, step S30 follows in order to subsequently issue call to the telephone number using the public communication network.

In step S30, "1" is set in a counter L to count the number of times of communication using the public communication network. In step S32, a call is issued to the registered telephone number of the public communication network in correspondence to the selected one-touch dial or the abbreviation dial by using the calling circuit 22.

In step S34, the signal at the signal level "1" is outputted to the signal line 24a and the CML is turned on. A pre-procedure is executed in step S36. In step S38, a check is made to see if a busy tone has been detected from the partner side. When the busy tone is detected, the processing routine advances to step S50 in order to interrupt the communication. When no busy tone is detected, step S40 follows.

In step S40, a check is made to see if the pre-procedure has been finished. When the pre-procedure is not finished, the processing routine is returned to step S36. When the pre-procedure is finished, step S42 follows.

In step S42, the image signal is transmitted. A procedure to execute the communication of a plurality of pages is also included in this processing routine. In step S44, a check is made to see if a communication error has occurred in the transmission of the image signal and the procedure. When the communication error occurs, the processing routine advances to step S55 in order to interrupt the communication. When no communication error occurs, step S46 follows.

In step S46, a check is made to see if the transmission of the image signal has been finished. When it is not finished, step S42 follows. If it is finished, step S48 follows and a post-procedure is executed. In step S50, the signal at the signal level "0" is outputted to the signal line 20a and the CML is turned off.

In step S52, a check is made to see whether a count value of a counter E is equal to or larger than 3 or not. When it is equal to or larger than 3, the communication is abandoned, so that the processing routine advances to step S2. When it is smaller than 3, step S54 follows and the value of the counter E is increased by "1". In step S56, the apparatus waits for two minutes and step S32 follows.

The second embodiment of the invention will now be described. According to the second embodiment, after the communication via the internet was executed in the foregoing first embodiment, a time that is required until communication via the internet is restarted owing to failure to establishment of the communication is gradually elongated during one communication.

Figure 6:
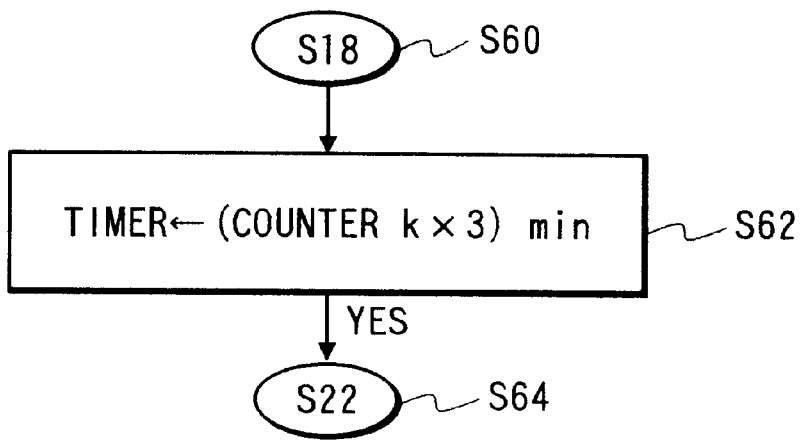
FIG. 6 is a flowchart showing the control operation in the second embodiment.

FIG. 6 is a flowchart showing a portion different from the first embodiment (FIGS. 2 to 5) in the operation of the second embodiment.

In FIG. 6, step S60 corresponds to step S18 mentioned above. In step S62, a value obtained by multiplying the count value of the counter K by three minutes is stored into the timer. In step S64, the processing routine advances to step S22 mentioned above.

The third embodiment of the invention will now be described. According to the third embodiment, after the communication via the internet was executed in the foregoing first embodiment, if information indicative of a communication impossible state is received when the communication is not established, the communication via the internet is retried only a predetermined number of times (total three times) after the elapse of a predetermined time (for example, soon) from the timing of the reception of the communication impossible information.

Figure 7:
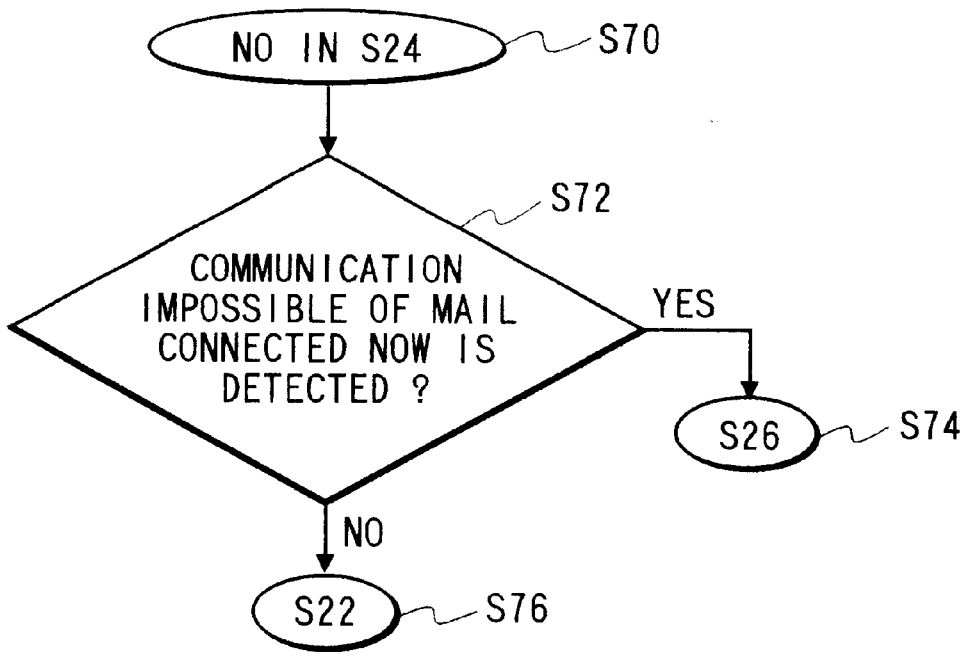
FIG. 7 is a flowchart showing the control operation in the third embodiment.

FIG. 7 is a flowchart showing a portion different from the first embodiment (FIGS. 2 to 5) in the operation of the third embodiment.

In FIG. 7, step S70 corresponds to the case of NO in step S24 mentioned above. In step S72, a check is made to see if a message that the communication of the mail which was connected just now is impossible has been detected. When it is detected, step S74 (S26) follows. If it is not detected, step S76 (S22) follows.

In the forgoing first to third embodiments, although nothing is mentioned with respect to the parallel processes of a plurality of JOBs, another job may be executed during a predetermined waiting time after execution of the communication, via the internet or a waiting time until the redialing of the public-communication network, or the like.

The fourth embodiment of the invention will now be described.

Figure 8:
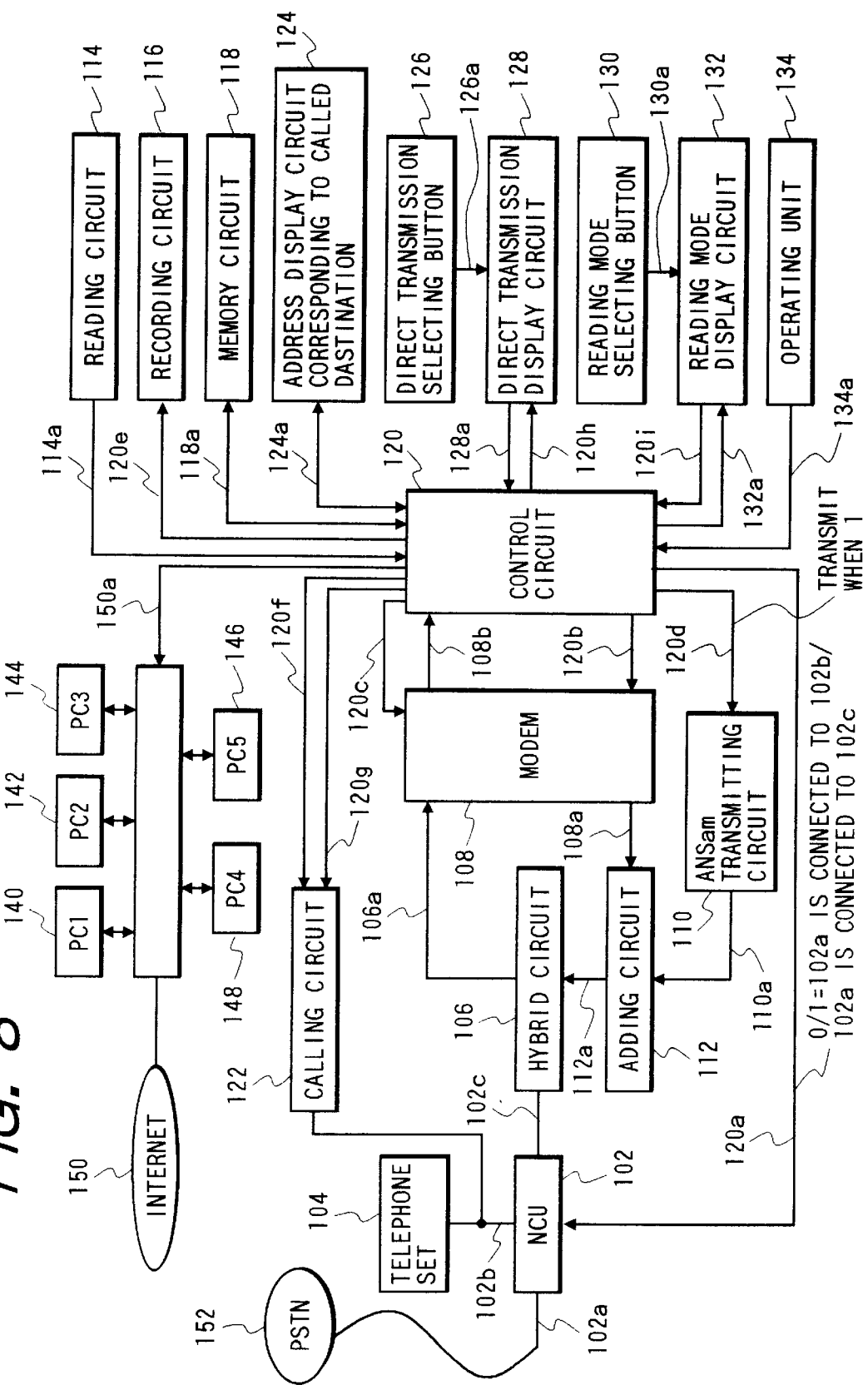
FIG. 8 is a block diagram showing a construction of a data communicating apparatus (facsimile apparatus) according to each of the fourth to sixth embodiments of the invention.

FIG. 8 is a block diagram showing a construction of a facsimile apparatus according to each of the fourth to sixth embodiments of the invention.

An NCU (network control unit) 102 connects a telephone network (public communication network) to a terminal of a line of this network in order to use the telephone network for a data communication or the like, performs a connection control of a telephone exchange network, performs a switching to a data communication path, and holds a loop. When the signal level (signal line 120a) from a control circuit 120 is equal to "0", the NCU 102 connects a telephone line 102a to a telephone set 104 side. When the signal level is equal to "1", the NCU 102 connects the telephone line 102a to a facsimile apparatus side. In an ordinary state, the telephone line 102a is connected to the telephone set 104 side.

A hybrid circuit 106 separates a signal of a transmission system and a signal of a reception system, sends a transmission signal from an adding circuit 112 to the telephone line 102a via the NCU 102, receives a signal from the partner side via the NCU 102, and transmits it to a modulator/demodulator (MODEM) 108 via a signal line 106a.

The MODEM 108 executes a modulation and a demodulation based on the ITU-T recommendation V.8, V.21, V.27ter, V.29, V.17, and V.34. Each transmitting mode is designated for the MODEM 108 by a signal line 120c. The MODEM 108 inputs a signal outputted to a signal line 120b, outputs modulation data to a signal line 108a, inputs a reception signal outputted to the signal line 106a, and outputs demodulation data to a signal line 108b.

An ANSam transmitting circuit 110 is a circuit for transmitting an ANSam signal. When a signal at the signal level "1" is outputted to a signal line 120d, the ANSam transmitting circuit 110 sends the ANSam signal to a signal line 110a. When the signal at the signal level "0" is outputted to the signal line 120d, the ANSam transmitting circuit 110 outputs no signal to the signal line 110a.

The adding circuit 112 receives information on the signal line 108a and information on the signal line 110a and outputs an addition result to a signal line 112a. A reading circuit 114 reads an image of an original and outputs the read image data to a signal line 114a. A recording circuit 116 sequentially records information outputted to a signal line 120e every line.

A memory circuit 118 is used to store original information or encoded information of the read data or to store received information, decoded information, or the like.

When a calling command pulse is generated onto a signal line 120g, a calling circuit 122 inputs telephone number information outputted to a signal line 120f and outputs the selection signal to a signal line 102b.

A called destination registering circuit 124 is a circuit for registering a destination (telephone number) to perform the G3 communication using the PSTN and a destination (IP address) for performing the data communication using the internet through a signal line 124a in correspondence to a called destination of the one-touch dial or the abbreviation dial.

A direct transmission selecting button 126 is used when a direct transmission is selected. When the button 126 is depressed, a depression pulse is generated onto a signal line 126a.

When a clear pulse is generated on a signal line 120h, a direct transmission display circuit 128 is lit off. After that, each time the depression pulse is generated onto the signal line 126a, the display circuit 128 repeats the light-on→light-off→light-on. When the direct transmission display circuit 128 is lit on, the signal at the signal level "1" is outputted to a signal line 128a. When it is lit off, the signal at the signal level "0" is outputted to the signal line 128a.

A reading mode selecting button 130 is used to select a reading mode. When the button 130 is depressed, a depression pulse is generated onto a signal line 130a.

When a clear pulse is generated onto a signal line 120i, a reading mode display circuit 132 displays "character mode". After that, each time the depression pulse is generated onto the signal line 130a, "halftone mode"→"character mode"→"halftone mode" are sequentially displayed. When the reading mode display circuit 132 displays "character mode", the signal at the signal level "0" is outputted to a signal line 132a. When the display circuit 132 displays "halftone mode", the signal at the signal level "1" is outputted to the signal line 132a.

An operating unit 134 has a one-touch dial, an abbreviation dial, a ten-key, *, ∩, # keys, an @ key, a set key, a start key, a registration key to the circuit 124, a key to select a mode for a quick transmission, other function keys, and the like. Information corresponding to the depressed key is outputted to a signal line 134a.

A signal line 150a is the LAN and PCs 140, 142, 144, 146, and 148 are connected to the LAN and are connected to a provider of an internet 150. The signal line 102a serving as a foregoing telephone line is connected to a PSTN (public switched telephone network) 152.

In the fourth embodiment of the invention, when the communication is selected, the control circuit 120 performs a control in a manner such that the direct transmission is set to the communication via the public communication network and the memory transmission is set to the communication via the internet.

Figure 9:
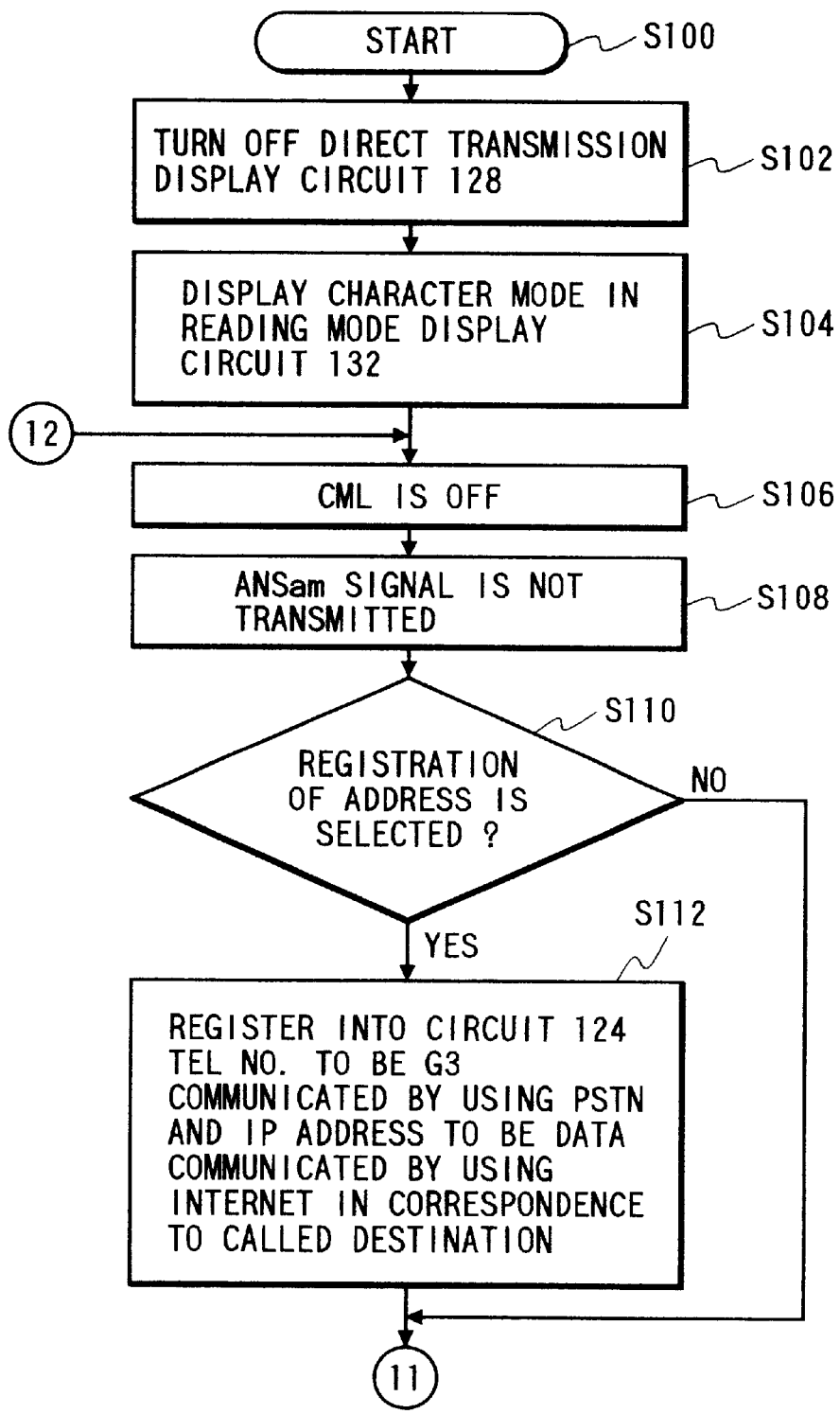
FIG. 9 is a flowchart showing the control operation in the fourth embodiment.
Figure 10:
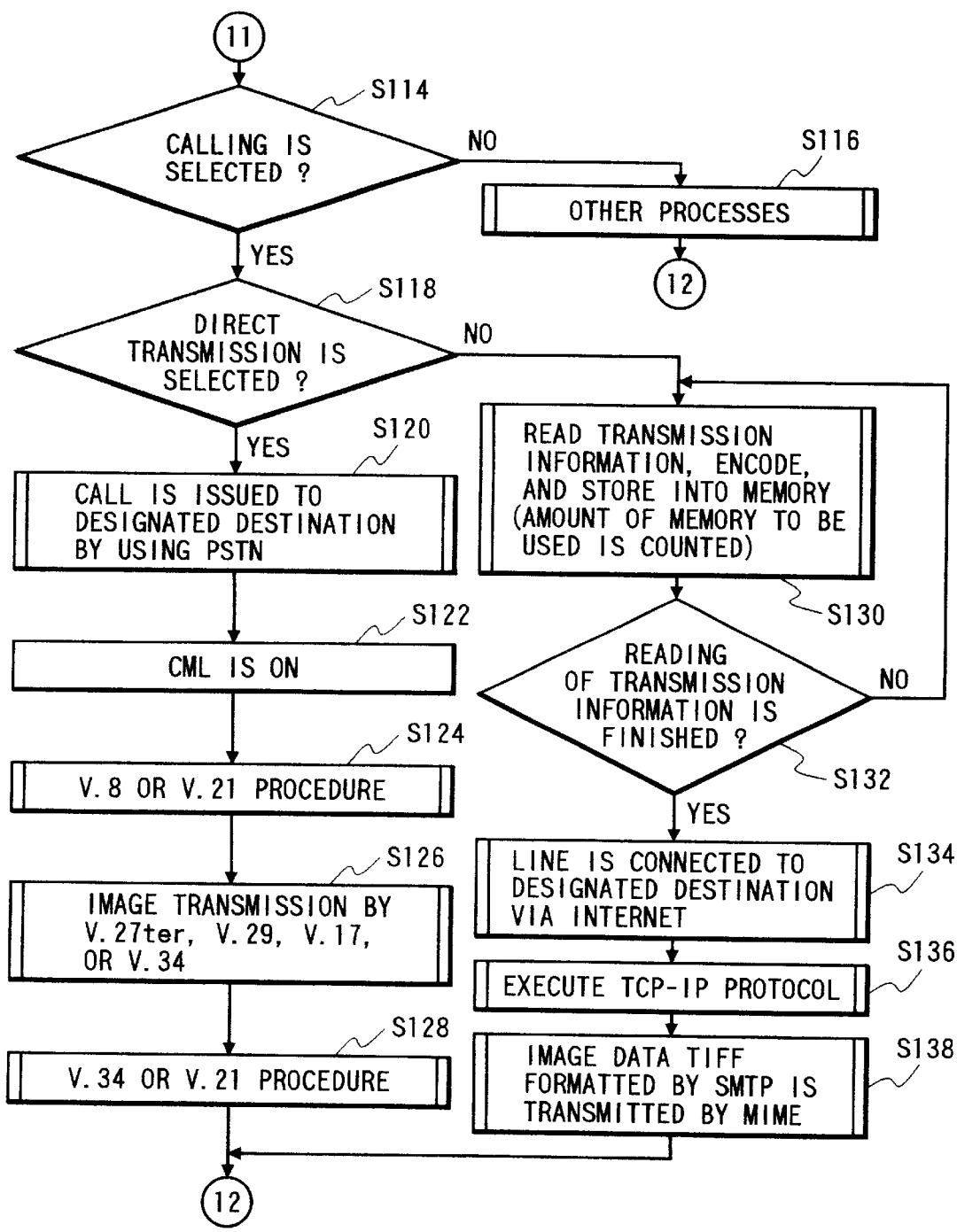
FIG. 10 is a flowchart showing the control operation in the fourth embodiment.

FIGS. 9 and 10 are flowcharts showing the operation of the control circuit 120 in the fourth embodiment of the invention.

First, in FIG. 9, the operation is started in step S100. In step S102, a clear pulse is generated to the signal line 120h and the direct transmission display circuit 128 is lit off.

In step S104, a clear pulse is generated to the signal line 120i and the reading mode display circuit 132 displays "character mode". In step S106, the signal at the signal level "0" is outputted to the signal line 124a and the CML relay is turned off.

In step S108, the signal at the signal level "0" is outputted to the signal line 120d, thereby setting the apparatus into a state where no ANSam signal is transmitted.

In step S110, information on the signal line 134a is inputted and a check is made to see if the registration of an address has been selected. If it is selected, step S112 follows the telephone number to be G3 communicated by using the PSTN and the IP address to be data communicated by using the internet are registered into an address registering circuit in correspondence to the calling destination through the signal line 124a. If it is not selected, step S114 follows.

In step S114, whether the calling has been selected or not is discriminated. When the calling is selected, step S118 follows. If NO, step S116 follows and other processes are executed.

In step S118, the information on the signal line 128a is inputted and whether the direct transmission has been selected or not is discriminated. When the direct transmission is selected, step S120 follows. When the memory transmission is selected, step S130 follows.

In step S120, a call is issued to the designated destination by the calling circuit 122 by using the PSTN line.

In step S122, the signal at the signal level "1" is outputted to the signal line 120a and the CML relay is turned on.

In step S124, a procedure of V.8 or V.21 is executed. In step S126, an image transmission of V.27ter, V.29, V.17, or V.34 is performed. In step S128, a procedure of V.34 or V.21 is executed.

In step S130, the transmission information is read encoded, and stored into the memory circuit 118 and, at the same time, a use amount of the memory for this communication is counted.

In step S132, a check is made to see if the reading operation of the transmission information has been finished. If NO, step S130 follows. When it is finished, step S134 follows. In step S134, the transmission information is connected to the designated destination through the internet.

In step S136, the TCP-IP protocol is executed. In step S138, the image data which was TIFF formatted according to the SMTP is transmitted according to the MIME.

The fifth embodiment of the invention will now be described. According to the fifth embodiment, when the memory transmission is selected in the foregoing fourth embodiment, if an amount of information to be transmitted is small, the communicating mode is set to the communication via the public communication network, while if the amount of information to be transmitted is large, the communicating mode is set to the communication via the internet.

Figure 11:
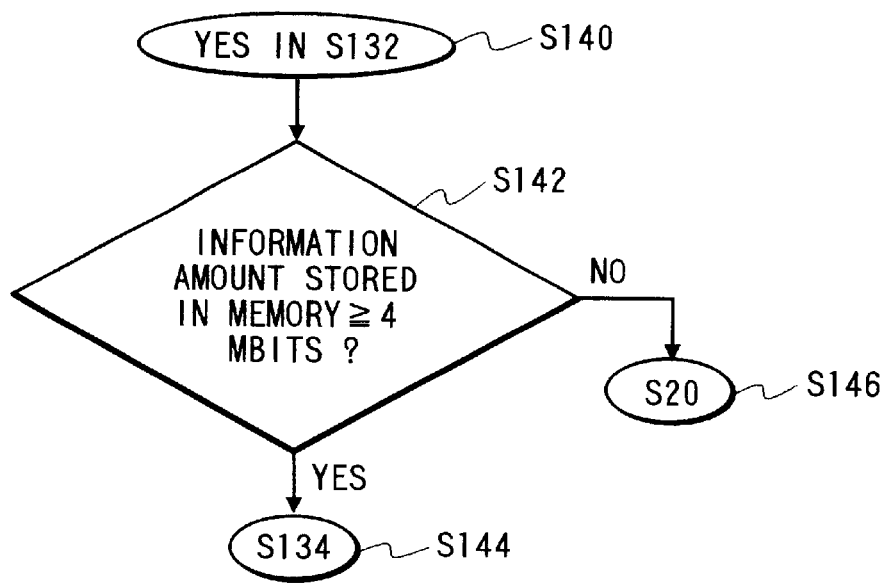
FIG. 11 is a flowchart showing the control operation in the fifth embodiment.

FIG. 11 is a flowchart showing a portion different from the foregoing fourth embodiment (FIGS. 9 and 10) in the operation of the fifth embodiment.

In FIG. 11, step S140 corresponds to YES in step S132. In step S142, a check is made to see whether the information amount of the present communication stored in the memory in step S130 is equal to or larger than 4 Mbits or not. When it is equal to or larger than 4 Mbits, step S144 (S134) follows. When it is smaller than 4 Mbits, step S146 (S120) follows.

The sixth embodiment of the invention will now be described. In the case where the memory transmission is selected in the fourth embodiment, when the "halftone mode" is selected as a reading mode at that time, the communicating mode is set to the communication via the internet. When "character mode" is selected, the communicating mode is set to the communication through the public communication network.

Figure 12:
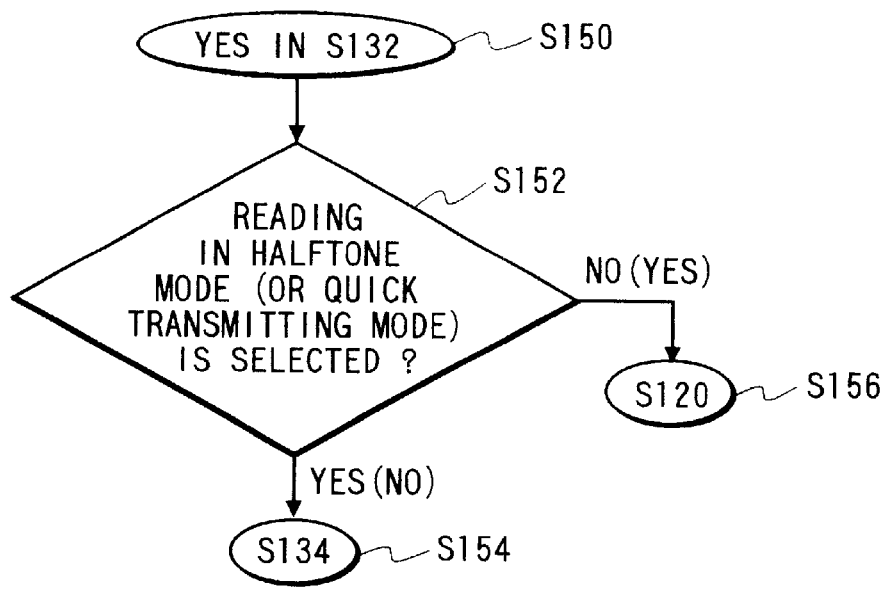
FIG. 12 is a flowchart showing the control operation in the sixth embodiment.

FIG. 12 is a flowchart showing a portion different from the fourth embodiment (FIGS. 9 and 10) in the operation of the sixth embodiment.

In FIG. 12, step S150 shows YES in step S132.

In step S152, a check is made to see if the reading mode when the information is stored into the memory is "halftone mode". When the reading mode is "halftone mode", step S154 (S134) follows. When it is "character mode", step S156 (S120) follows.

When the quick transmitting mode is selected by a key input of the operating unit 134, the facsimile communication via the PSTN is selected. If NO, the communication via the internet is selected.

The seventh embodiment of the invention will now be described.

Figure 13:
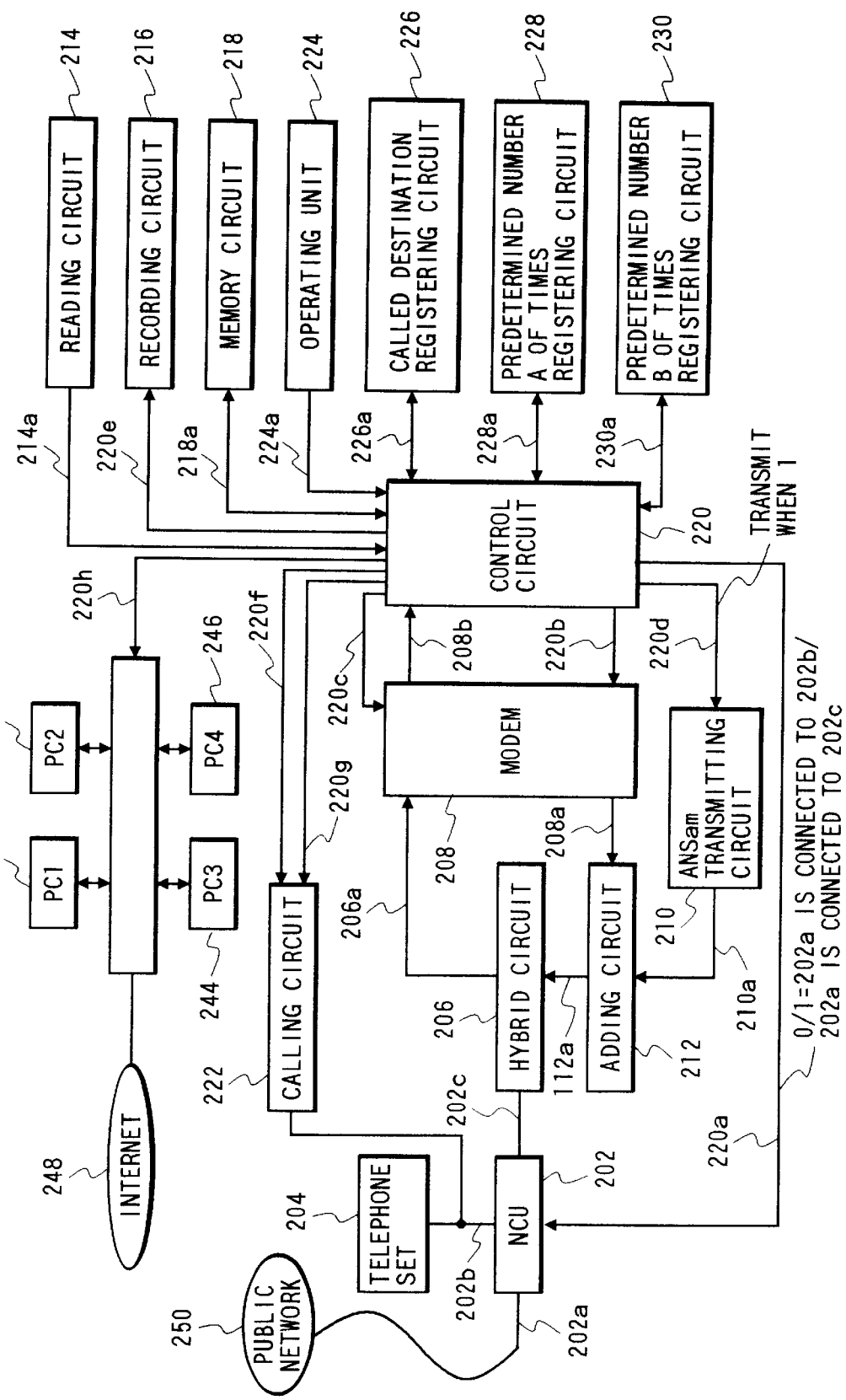
FIG. 13 is a block diagram showing a construction of a data communicating apparatus (facsimile apparatus) according to the seventh embodiment of the invention.
Figure 14:
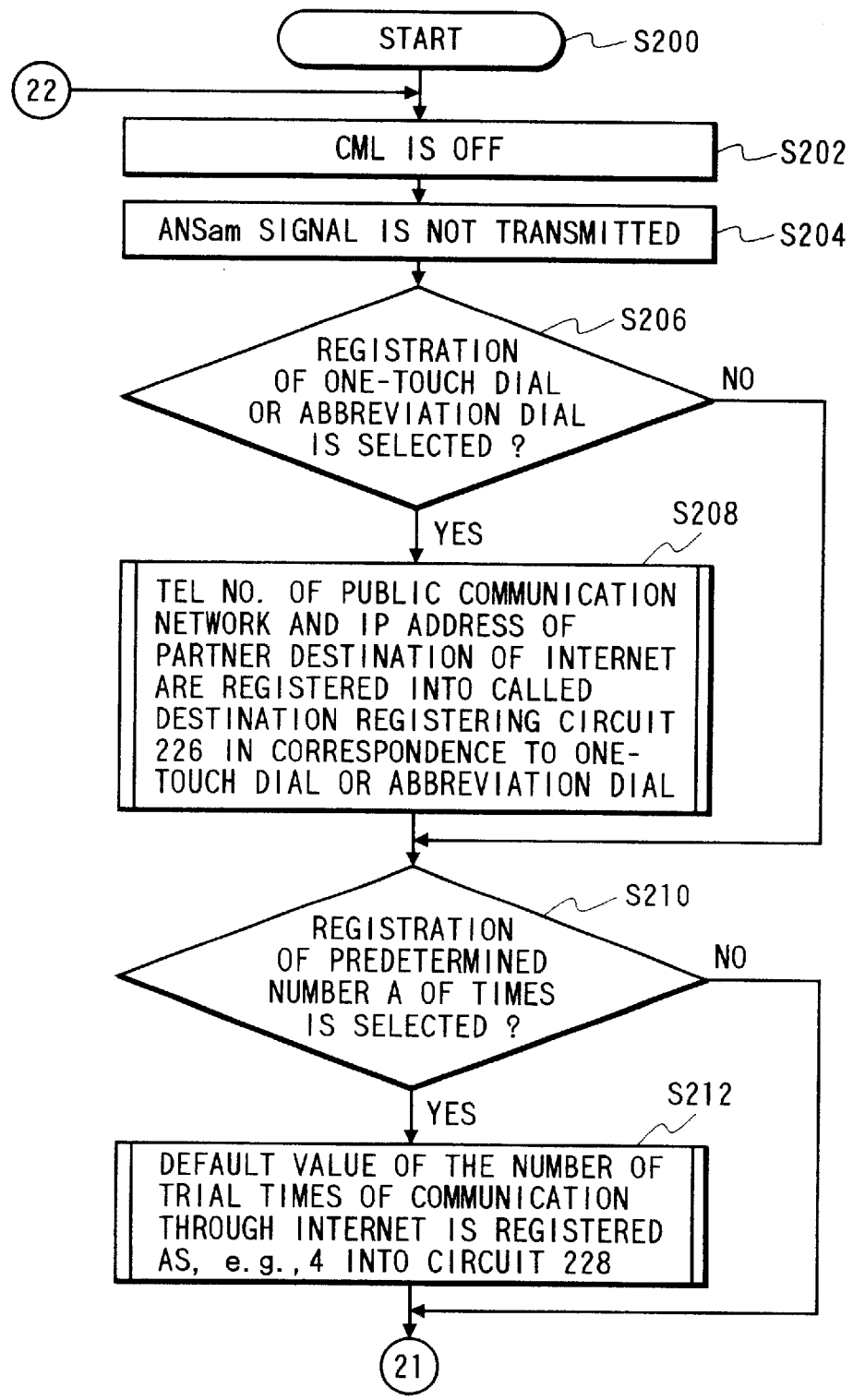
FIG. 14 is a flowchart showing the control operation in the seventh embodiment.
Figure 15:
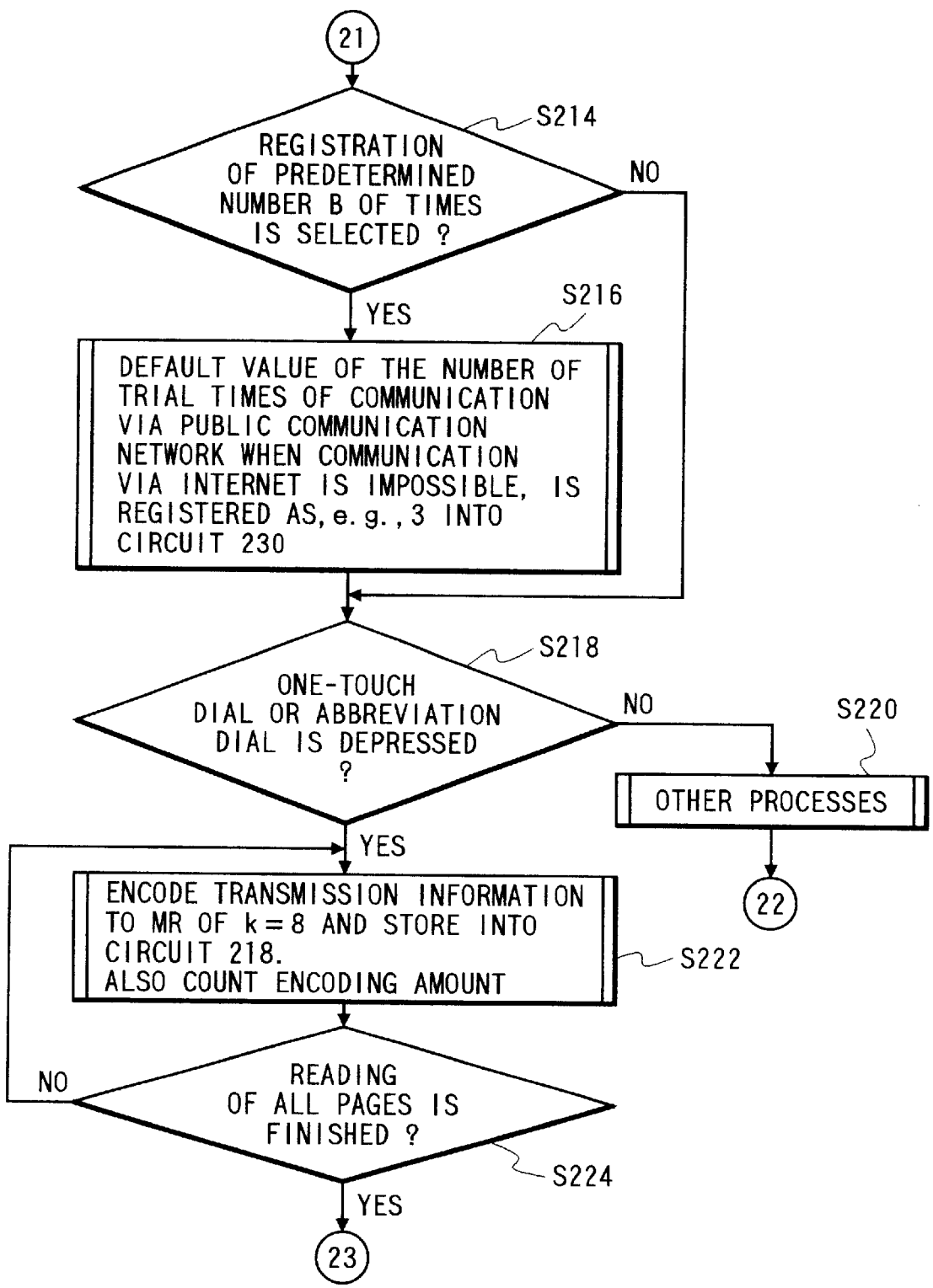
FIG. 15 is a flowchart showing the control operation in the seventh embodiment.
Figure 16:
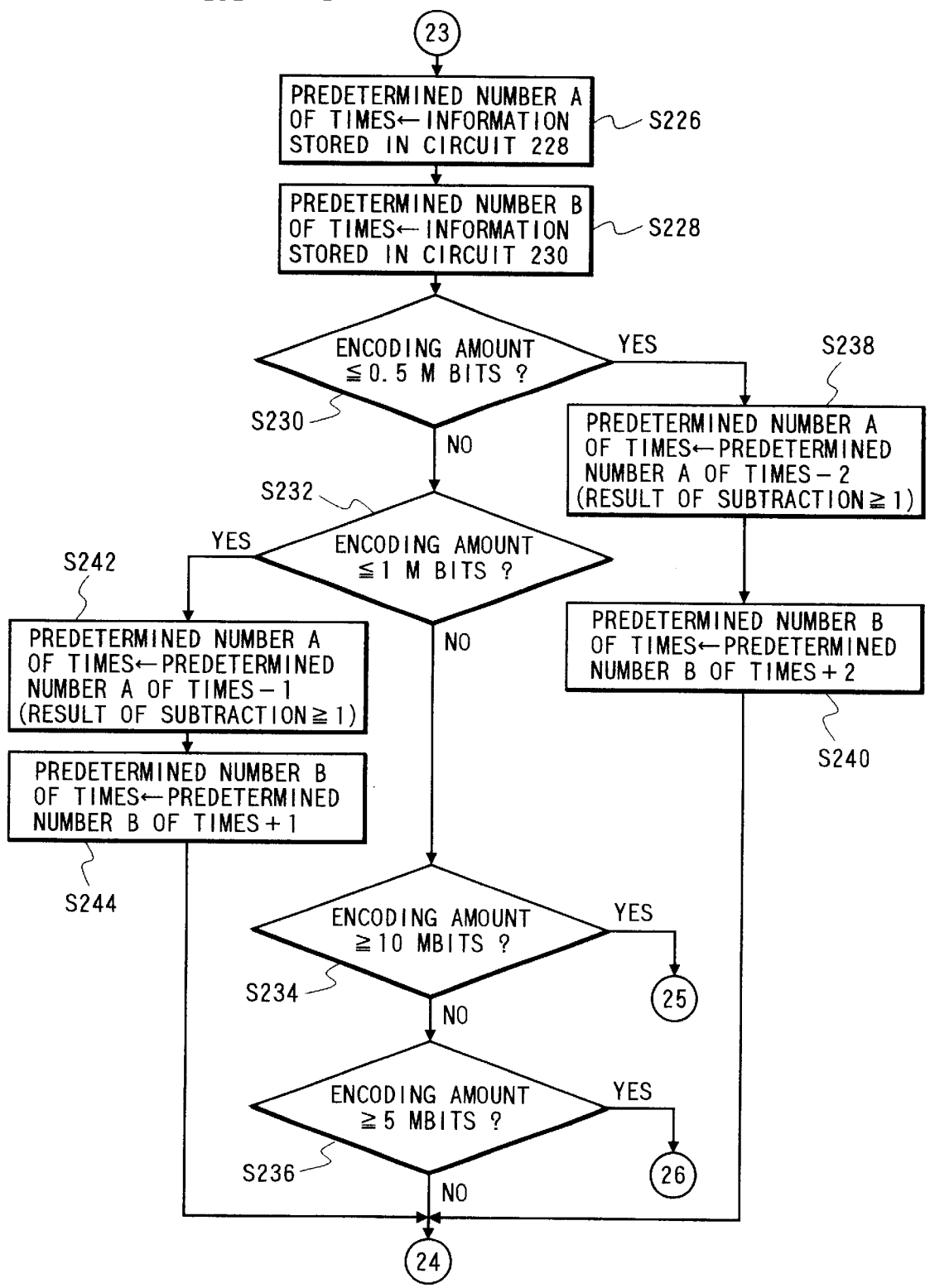
FIG. 16 is a flowchart showing the control operation in the seventh embodiment.
Figure 17:
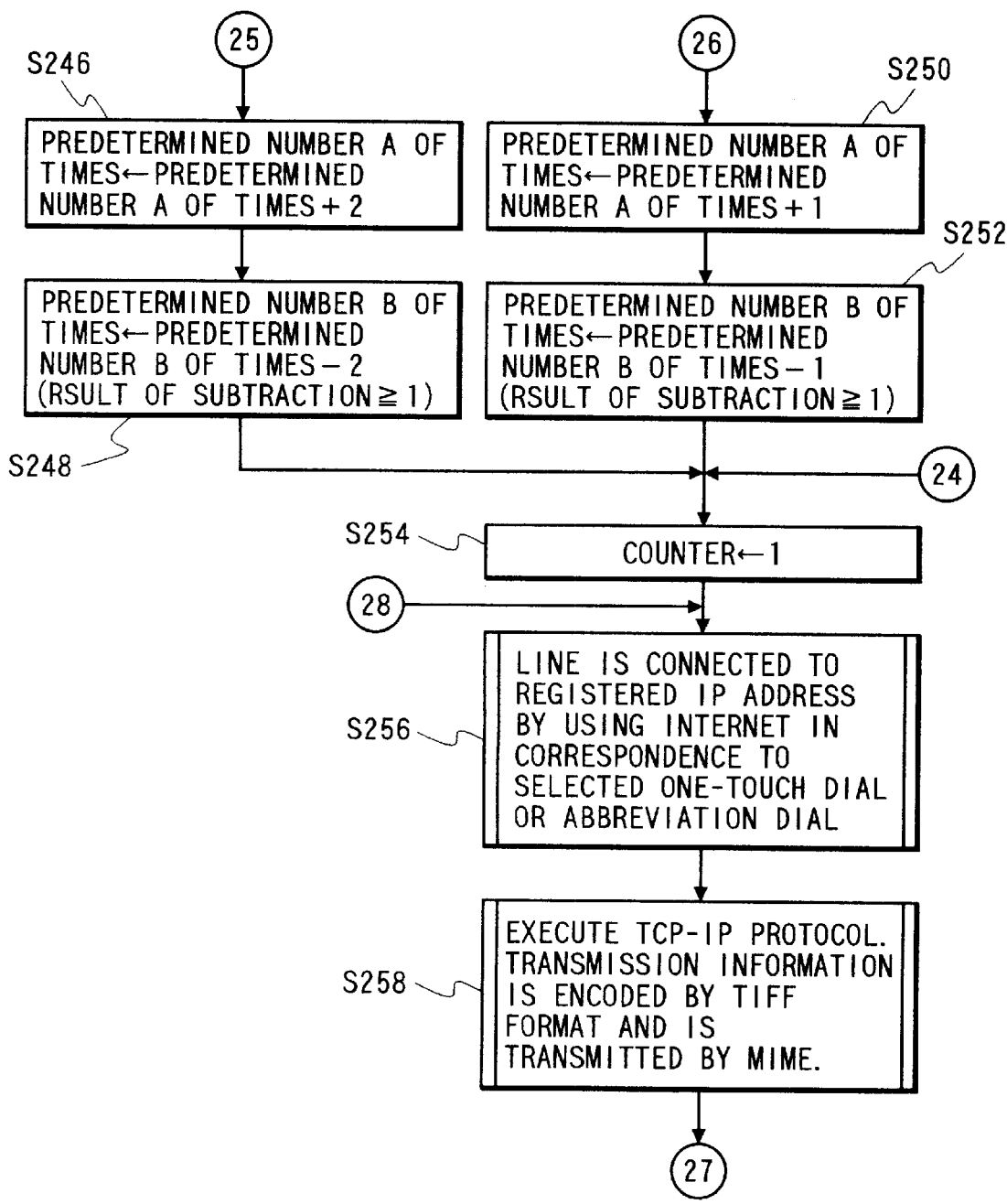
FIG. 17 is a flowchart showing the control operation in the seventh embodiment.
Figure 18:
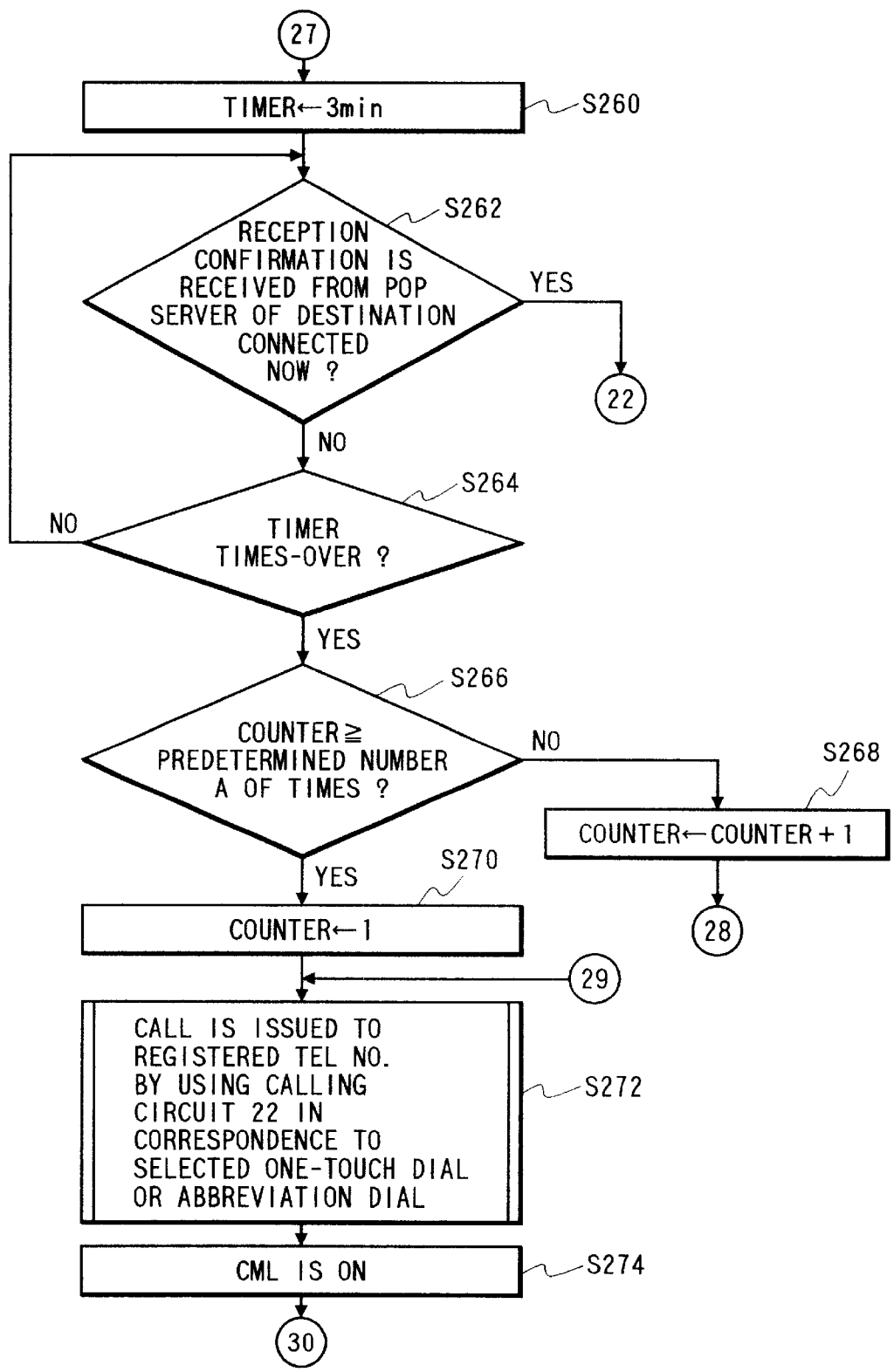
FIG. 18 is a flowchart showing the control operation in the seventh embodiment.

FIG. 13 is a block diagram showing a construction of a facsimile apparatus according to the seventh embodiment of the invention.

An NCU (network control unit) 202 connects a telephone network to a terminal of a line of this network in order to use the telephone network for a data communication or the like, performs a connection control of a telephone exchange network, performs a switching to a data communication path, and holds a loop. When the signal level (signal line 220a) from a control circuit 220 is equal to "0", the NCU 202 connects a telephone line 202a to a telephone set 204 side. When the signal level is equal to "1", the NCU 202 connects the telephone line 202a to a facsimile apparatus side. In an ordinary state, the telephone line 202a is connected to the telephone set 204 side.

A hybrid circuit 206 separates a signal of a transmission system and a signal of a reception system, sends a transmission signal from an adding circuit 212 to the telephone line 202a via the NCU 202, receives a signal from the partner side via the NCU 202, and transmits it to a modulator/demodulator (MODEM) 208 via a signal line 206a.

The MODEM 208 executes a modulation and a demodulation based on the ITU-T recommendation V.8, V.21, V.27ter, V.29, V.17, and V.34. Each transmitting mode is designated for the MODEM 208 by a signal line 220c. The MODEM 208 inputs a signal outputted to a signal line 220b, outputs modulation data to a signal line 208a, inputs a reception signal outputted to the signal line 206a, and outputs demodulation data to a signal line 208b.

An ANSam transmitting circuit 210 is a circuit for transmitting an ANSam signal. When a signal at the signal level "1" is outputted to a signal line 220d, the ANSam transmitting circuit 210 sends the ANSam signal to a signal line 210a. When the signal at the signal level "0" is outputted to the signal line 220d, the ANSam transmitting circuit 210 outputs no signal to the signal line 210a.

The adding circuit 212 receives information on the signal line 208a and information on the signal line 210a and outputs an addition result to a signal line 212a. A reading circuit 214 reads an image of an original and outputs the read image data to a signal line 214a. A recording circuit 216 sequentially records information outputted to a signal line 220e every line.

A memory circuit 218 is used to store original information or encoded information of the read data or to store received information, decoded information, or the like.

When a calling command pulse is generated onto a signal line 220g, a calling circuit 222 inputs telephone number information outputted to a signal line 220f and outputs a selection signal to a signal line 202b.

An operating unit 224 has a one-touch dial, an abbreviation dial, a ten-key, *, •, # keys, an @ key, registration keys to the circuits 226, 228, and 230, a set key, a start key, other function keys, and the like. Information corresponding to the depressed key is outputted to a signal line 224a.

A called destination registering circuit 226 is used to register a calling destination. The address to be connected by using the internet and the telephone number using the public communication network are registered through a signal line 226a in correspondence to each destination of the one-touch dial and abbreviation dial.

A registering circuit 228 is used to register a default value of a predetermined number A of times to try the communication via the internet through a signal line 228a.

When the line cannot be connected even if the communication was tried the predetermined number A of times via the internet, a registering circuit 230 is used to register a default value of a predetermined number B of times through a signal line 230a in order to subsequently retry the communication only the predetermined number B of times through the public communication network.

PCs 240, 242, 244, and 246 are connected to the LAN via a signal line 220h and are further connected to an internet 248. The signal line 202a serving as a telephone line is connected to a public communication network 250.

The control circuit 220 executes a control in a manner such that when the communication is selected in the seventh embodiment of the invention, the communication through the internet is tried the predetermined number A of times, and when the communication is not established even if the communication was tried the predetermined number A of times, the communication using the public communication network is tried the maximum predetermined number B of times. Further, the control circuit 220 also executes a control to change the predetermined numbers A and B of times in accordance with the conditions.

For example, when the facsimile transmission is selected, an amount of information to be communicated is estimated. As for the predetermined number A of times, when the information amount is equal to or larger tan 10 Mbits, "2" is added to the value of A registered in the registering circuit 228. When it is equal to or larger than 5 Mbits, "1" is added to A. When it is equal to or less than 0.5 Mbits, "2" is subtracted from A. When it is equal to or less than 1 Mbits, "1" is subtracted from A.

As for the predetermined number B of times, when the information amount is equal to or less than 0.5 Mbits for the number of times registered in the registering circuit 230, "2" is added to B. When it is equal to or less than 1 Mbits, "1" is added to B. When it is equal to or larger than 10 Mbits, "2" is subtracted from B. When it is equal to or larger than 5 Mbits, "1" is subtracted from B.

FIGS. 14 to 19 are flowcharts showing the operation of the control circuit 220 in the seventh embodiment of the invention.

First, in step S202, the signal at the signal level "0" is outputted to the signal line 220a and the CML is turned off. In step S204, the signal at the signal level "0" is outputted to the signal line 220d, thereby setting the apparatus into a state where the ANSam signal is not transmitted.

In step S206, the information on the signal line 224a is inputted and a check is made to see if the registration of the one-touch dial or abbreviation dial has been selected. When it is not selected, step S210 follows. When it is selected, step S208 follows.

In step S208, the telephone number of the public communication network and the IP address of the partner destination of the internet are registered into the called destination registering circuit 226 through the signal line 226a in correspondence to the one-touch dial or abbreviation dial.

In step S210, the information on the signal line 224a is inputted and whether the registration of the predetermined number A of times has been selected or not is discriminated. When it is selected, step S212 follows. If NO, step S214 follows.

In step S212, a default value of the number of times of trial of the communication, for example, 4 is registered into the registering circuit 228 through the signal line 228a through the internet.

In step S214, the information on the signal line 224a is inputted and whether the registration of the predetermined number B of times has been selected or not is discriminated. When it is selected, step S216 follows. If NO, step S218 follows.

In step S216, a default value of the number of times (for example, 3) of the communication to be filed via the public communication network, when the communication through the internet is impossible is registered into the registering circuit 230 through the signal line 230a.

In step S218, the information on the signal line 224a is inputted and a check is made to see if the one-touch dial or the abbreviation dial has been depressed. If YES, step S222 follows. If NO, step S220 follows and other processes are executed.

In step S222, the information to be transmitted is encoded into MR of (K=8) and stored into the memory circuit 218 and, at the same time, an encoding amount is counted.

In step S224, a check is made to see if the reading operation of all pages has been finished. If NO, step S222 follows. If YES, step S226 follows.

In step S226, the information on the signal line 228a is inputted and the information stored in the registering circuit 228 is stored into an area of the predetermined number A of times.

In step S228, the information on the signal line 230a is inputted and the information stored in the registering circuit 230 is stored into an area of the predetermined number B of times.

In steps S230, S232, S234, and S236, the encoding amount of the transmission information is discriminated. When it is equal to or less than 0.5 Mbits, "2" is subtracted from the value of the predetermined number A of times (S238) and "2" is added to the value of the predetermined number B of times (S240). When it is larger than 0.5 Mbits and is equal to or less than 1 Mbits, "1" is subtracted from the value of the predetermined number A of times (S242) and "1" is added to the value of the predetermined number B of times (S244). When it is equal to or larger than 10 Mbits, "2" is added to the value of the predetermined number A of times (S246) and "2" is subtracted from the value of the predetermined number B of times (S248). When it is equal to or larger than 5 Mbits and is less than 10 Mbits, "1" is added to the value of the predetermined number A of times (S250) and "1" is subtracted from the value of the predetermined number B of times (S252). In the other cases, the values of the predetermined numbers (A and B) of times are not changed. When a resultant value obtained by subtracting is less than 1, "1" is set.

In step S254, "1" is set in a counter to count the number of times of the call generation to the internet. In step S256, the line is connected to the registered IP address by using the internet network in correspondence to the selected one-touch dial or abbreviation dial.

In step S258, the TCP-IP protocol is executed and the transmission information is encoded according to the TIFF format and transmitted according to the MIME. In step S260, a time of three minutes is set into the timer.

In steps S262 and S264, a check is made to see if a reception acknowledgment has been received from the POP server of the destination which is now connected before the timer times over. If the reception acknowledgment is received, step S202 follows and the communication is finished. When the timer times over, step S266 follows.

In step S266, a check is made to see whether the value of the counter is equal to or larger than the predetermined number A of times or not. If NO, step S268 follows and the value of the counter is increased by "1". If YES, step S270 follows.

In step S270, "1" is set in the counter to count the number of times of the call generation to the public communication network. In step S272, a call is issued to the registered telephone number by using the calling circuit 222 in correspondence to the selected one-touch dial or abbreviation dial, thereby connecting the line to the public communication network.

In step S274, the signal at the signal level "1" is outputted to the signal line 220a and the CML relay is turned on. In step S276, a pre-procedure is executed. In step S278, whether a busy tone has been detected or not is discriminated. When the busy tone is detected, step S288 follows. If NO, step S280 follows.

In step S280, a check is made to see if the pre-procedure has been finished. If it is finished, step S282 follows. If NO, step S276 follows.

In step S282, the transmission of the image signal and a post-procedure are executed. In step S284, a check is made to see if the communication has been finished. If it is not finished, step S282 follows. When it is finished, step S286 follows.

In step S286, a check is made to see if the processing routine is finished as an error. When it is normally finished, step S202 follows. When it is finished as an error, step S288 follows. In step S288, the signal at the signal level "0" is outputted to the signal line 220a and the CML relay is turned off.

In step S290, a check is made to see whether the value of the counter is equal to or larger than the predetermined number B of times or not. When it is equal to or larger than the predetermined number B of times, step S290 follows. When it is less than B, step S292 follows and the value of the counter is increased by "1". In step S294, the apparatus waits for two minutes.

In step S296, information showing that although the communication via the internet and the public communication network was tried, the communication is impossible is recorded into a communication result report. After that, step S202 follows.

As described above, when the communication is selected, the communication via the internet is first executed and, even if the processes are finished as an error, the communication is tried a-plurality of number of times. Therefore, the user can execute the communication of high certainty and at low communication costs by the key operation of one time. When the communication is not established even if the communication via the internet was tried the predetermined number of times, the communicating mode can be shifted to the facsimile communication using the telephone network and the trial of a plurality of number of times can be performed here. Therefore, it is a rare case that the communication is impossible. An apparatus which can be easily used can be provided to the user.

When the communication via the internet is executed, it is presumed that in many cases, a time of the notification of the end of the reception is longer than a redialing interval of the communication using the telephone network. However, it is possible to properly cope with such a situation.

After the communication via the internet was executed, if the notification of the end of the reception is not returned, it is discriminated that the traffic is busy. Since a time until the communication through the internet is restarted is gradually elongated in one communication, a possibility of the communication via the internet can be raised.

When the communication is finished, the line is not again connected to the destination but the proper operation can be derived.

After the communication via the internet was executed, when a report indicating that the communication is impossible is sent, the proper control can be executed.

In the direct transmission, the communication via the telephone network can be performed and a transmitting speed is not fairly higher than a reading speed, so that the apparatus does not wait for the communication. Further high secrecy, certainty, and instantaneousness of the communication can be assured. On the other hand, in the memory transmission, the communication via the internet is executed, the communication can be performed at a very high speed, and the communication costs can be remarkably reduced.

When the information amount is large, the communication via the internet is executed, thereby realizing a large reduction of the communication costs. When the information amount is small, the communication via the telephone network is executed, thereby attaching importance to the secrecy, certainty, and instantaneousness and extremely suppressing an increase in communication costs.

In case of "halftone mode" in which an information amount is large, by performing the communication via the internet, a remarkable decrease in communication costs is realized. In case of "character mode" in which an information amount is small, by executing the communication via the telephone network, importance is attached to the secrecy, certainty, and instantaneousness and an increase in communication costs is also fairly suppressed.

In case of the quick transmitting mode, the facsimile transmission via the PSTN (telephone network) is executed. In case of a mode instead of the quick transmitting mode, the facsimile information is transmitted by an electronic mail via the internet. In this manner, the transmission according to the requirement (data to be transmitted) of the operator can be realized.

When the communication through the internet is preferable, the number of trial times of the communication via the internet is increased. In case of the communication such that the network can be soon switched to the telephone network, the number of trial times of the communication through the internet can be reduced. Thus, the calling control can be performed in accordance with an object of the user.

When an amount of information to be communicated is large, a priority is given to the communication costs and the number of trial times of the communication via the internet is increased. When an amount of information to be communicated is small, since a decrease in costs by the communication via the internet is small, the number of trial times of the communication via the internet is reduced, the communicating mode is switched to the communication via the telephone network, so that a priority can be given to the certainty, instantaneousness, and secrecy.

When an amount of information to be communicated is small, since the decrease in costs by the internet communication is small, the number of trial times of the communication via the telephone network in consideration of the certainty, secrecy, and instantaneousness is increased. When an amount of information to be communicated is large, the number of trial times of the communication via the internet is increased and, at the same time, the number of trial times of the subsequent communication via the telephone network is reduced, thereby enabling a priority to be given to the costs (communication costs).

The present invention is not limited to the foregoing embodiments but many modifications and variations are possible within the spirit and scope of the appended claims of the invention.

What is claimed is:

1. A data communication apparatus that performs data communication through public telephone and internet networks, said apparatus comprising:

a storage unit adapted to store therein first access information to perform a data communication to a communication partner destination through the internet network and second access information to perform a data communication to the communication partner destination through the public telephone network;

a detector adapted to detect a status of the data communication; and a controller adapted to select one of the internet network and the public telephone network based on the status detected by said detector, and to automatically access the selected network in accordance with the access information in said storage unit corresponding to the selected network, to enable the data communication to be executed, wherein, in a case where the data communication does not succeed after data communication via the internet network has been tried a predetermined number of times, then data communication through the public telephone network is selected, and wherein communication through the internet network does not require use of the public telephone network.

2. An apparatus according to claim 1, further comprising an interval change unit adapted to change an interval in which the data communication is tried, in a case where data communication through the internet network is tried the predetermined number of times.

3. A data communication apparatus that performs data communication via public telephone and internet networks, said apparatus comprising:

a storage unit adapted to store therein first access information to perform a data communication to a communication partner destination through the internet network and second access information to perform a data communication to the communication partner destination through the public telephone network;

a detector adapted to detect conditions of the data communication; and a controller adapted to select one of the internet network and the public telephone network based on the conditions detected by said detector, and to automatically access the selected network in accordance with the access information in said storage unit corresponding to the selected network, to enable the data communication to be executed, wherein said detector detects a designated communication mode and said controller selects one of the internet network and the public telephone network in accordance with the designated communication mode, wherein, when said detector detects that the designated communication mode is a quick transmission mode for quickly transmitting data, said controller selects the public telephone network for the data communication, and wherein communication through the internet network does not require use of the public telephone network.

4. An apparatus according to claim 3, wherein, when said detector detects that data to be transmitted corresponds to data read in a halftone reading mode, said controller selects the internet network for the data communication.

5. A data communication apparatus that performs data communication through public telephone and internet networks, said apparatus comprising:

a storage unit adapted to store therein first access information to perform a data communication to a communication partner destination through the internet network and second access information to perform a data communication to the communication partner destination through the public telephone network;

a detector adapted to detect conditions of the data communication;

a controller adapted to select one of the internet network and the public telephone network based on the conditions detected by said detector, and to automatically access the selected network in accordance with the access information in said storage unit corresponding to the selected network, to enable the data communication to be executed; and a reading unit adapted to read an original image, wherein, when said detector detects a direct transmission mode, said controller controls the data communication such that image data read by said reading unit is directly transmitted through the public telephone network after reading, wherein, when said detector detects a memory transmission mode, said controller controls the data communication such that data stored in a memory is transmitted through the internet network, and wherein communication through the internet network does not require use of the public telephone network.

6. A data communication apparatus that performs data communication through public telephone and internet networks, said apparatus comprising:

a storage unit, arranged to store therein first access information to perform a data communication to a communication partner destination through the internet network and second access information to perform a data communication to the communication partner destination through the public telephone network;

a detector, arranged to detect conditions of the data communication; and a controller, arranged to select one of the internet network and the public telephone networks based on the conditions detected by said detector, and to automatically access the selected network in accordance with the access information in said storage unit corresponding to the selected network, to enable the data communication to be executed, wherein said detector detects an amount of data to be communicated, and said controller selects one of the internet network and the public telephone network in accordance with the amount of data to be communicated, and wherein communication through the internet network does not require use of the public telephone network.

7. An apparatus according to claim 6, wherein, when the amount of data to be communicated is equal to or larger than a predetermined amount, said controller selects the internet network, and, when the amount of data to be communicated is less than the predetermined amount, said controller selects the public telephone network.

8. A data communication apparatus that performs data communication through public telephone and internet networks, said apparatus comprising:

a storage unit, arranged to store therein first access information to perform a data communication to a communication partner destination through the internet network and second access information to perform a data communication to the communication partner destination through the public telephone network;

a detector, arranged to detect conditions of the data communication;

a controller, arranged to select one of the internet network and the public telephone network based on the conditions detected by said detector, and to automatically access the selected network in accordance with the access information in said storage unit corresponding to the selected network, to enable the data communication to be executed; and a reading unit, arranged to read an original image, wherein said detector detects a designated communication mode and said controller selects one of the internet network and the public telephone network in accordance with the designated communication mode, and wherein, when the designated communication mode is a halftone mode in which halftone image data read by said reading unit is to be transmitted, said controller selects the internet network.

9. An apparatus according to any one of claims 1, 3, 5, 6, and 8, wherein said data communication apparatus is a facsimile apparatus.

10. A data communication method in a data communication apparatus that performs data communication through public telephone and internet networks, said method comprising the steps of:

storing first access information to perform a data communication to a communication partner destination through the internet network and second access information to perform a data communication to the communication partner destination through the public telephone network;

detecting a status of the data communication; and selecting one of the internet network and the public telephone network based on the detected status, and automatically accessing the selected network in accordance with the stored access information corresponding to the selected network, to enable the data communication to be executed, wherein, in a case where the data communication does not succeed after data communication via the internet network has been tried a predetermined number of times, then data communication through the public telephone network is selected, and wherein communication through the internet network does not require use of the public telephone network.

11. A method according to claim 10, wherein, in a case where data communication through the internet network is tried the predetermined number of times, an interval in which the data communication is tried is changed.

12. A data communication method in a data communication apparatus that performs data communication via public telephone and internet networks, said method comprising the steps of:

storing first access information to perform a data communication to a communication partner destination through the internet network and second access information to perform a data communication to the communication partner destination through the public telephone network;

detecting conditions of the data communication; and selecting one of the internet network and the public telephone network based on the detected conditions, and automatically accessing the selected network in accordance with the stored access information corresponding to the selected network, to enable the data communication to be executed, wherein said detecting step detects a designated communication mode and said selecting step selects one of the internet network and the public telephone network in accordance with the designated communication mode, wherein, when the designated communication mode is a quick mode for quickly transmitting data, the public telephone network is selected in said selecting step, and wherein communication through the internet network does not require use of the public telephone network.

13. An method according to claim 12, wherein, when said detecting step detects that data to be transmitted corresponds to data read in a halftone reading mode, said selecting step selects the internet network for the data communication.

14. A data communication method in a data communication apparatus that performs data communication through public telephone and internet networks, said method comprising the steps of:

storing first access information to perform a data communication to a communication partner destination through the internet network and second access information to perform a data communication to the communication partner destination through the public telephone network;

detecting conditions of the data communication;

selecting one of the internet network and the public telephone network based on the detected conditions, and automatically accessing the selected network in accordance with the stored access information corresponding to the selected network, to enable the data communication to be executed; and reading an original image, wherein, when said detecting step detects a direct transmission mode, said selecting step controls the data communication by selecting the public telephone network, such that image data read in said reading step is directly transmitted through the public telephone network after reading, wherein, when said detecting step detects a memory transmission mode, said selecting step controls the data communication by selecting the internet network, such that data stored in a memory is transmitted through the internet network, and wherein communication through the internet network does not require use of the public telephone network.

15. A data communication method in a data communication apparatus that performs data communication through public telephone and internet networks, said method comprising the steps of:

storing first access information to perform a data communication to a communication partner destination through the internet network and second access information to perform a data communication to the communication partner destination through the public telephone network;

detecting conditions of the data communication; and selecting one of the internet network and the public telephone network based on the detected conditions, and automatically accessing the selected network in accordance with the stored access information corresponding to the selected network, to enable the data communication to be executed, wherein, in said detecting step, an amount of data to be communicated is detected, and, in said selecting step, one of the internet network and the public telephone network is selected in accordance with the detected amount of data to be communicated, and wherein communication through the internet network does not require use of the public telephone network.

16. A method according to claim 15, wherein, when the amount of data to be communicated is equal to or larger than a predetermined amount, said selecting step selects the internet network, and, when the amount of data to be communicated is less than the predetermined amount, said selecting step selects the public telephone network.

17. A data communication method in a data communication apparatus that performs data communication through public telephone and internet networks, said method comprising the steps of:

storing first access information to perform a data communication to a communication partner destination through the internet network and second access information to perform a data communication to the communication partner destination through the public telephone network;

detecting conditions of the data communication;

selecting one of the internet network and the public telephone network based on the detected conditions, and automatically accessing the selected network in accordance with the stored access information corresponding to the selected network, to enable the data communication to be executed; and reading an original image, wherein said detecting step detects a designated communication mode and said selecting step selects one of the internet network and the public telephone network in accordance with the designated communication mode, and wherein, when the designated communication mode is a halftone mode in which halftone image data read in said reading step is to be transmitted, the internet network is selected in said selecting step.

18. A method according to any one of claims 10, 12, 14, 15, and 17, wherein the data communication apparatus is a facsimile apparatus.

* * * * *

UNITED STATES PATENT AND TRADEMARK OFFICE
CERTIFICATE OF CORRECTION

PATENT NO. : 6,519,247 B1
DATED : February 11, 2003
INVENTOR(S) : Takehiro Yoshida It is certified that error appears in the above-identified patent and that said Letters Patent is hereby corrected as shown below:

<u>Title page,</u>
Item [57], ABSTRACT,
Line 3, "internet," should read -- Internet, --.

Figure 19:
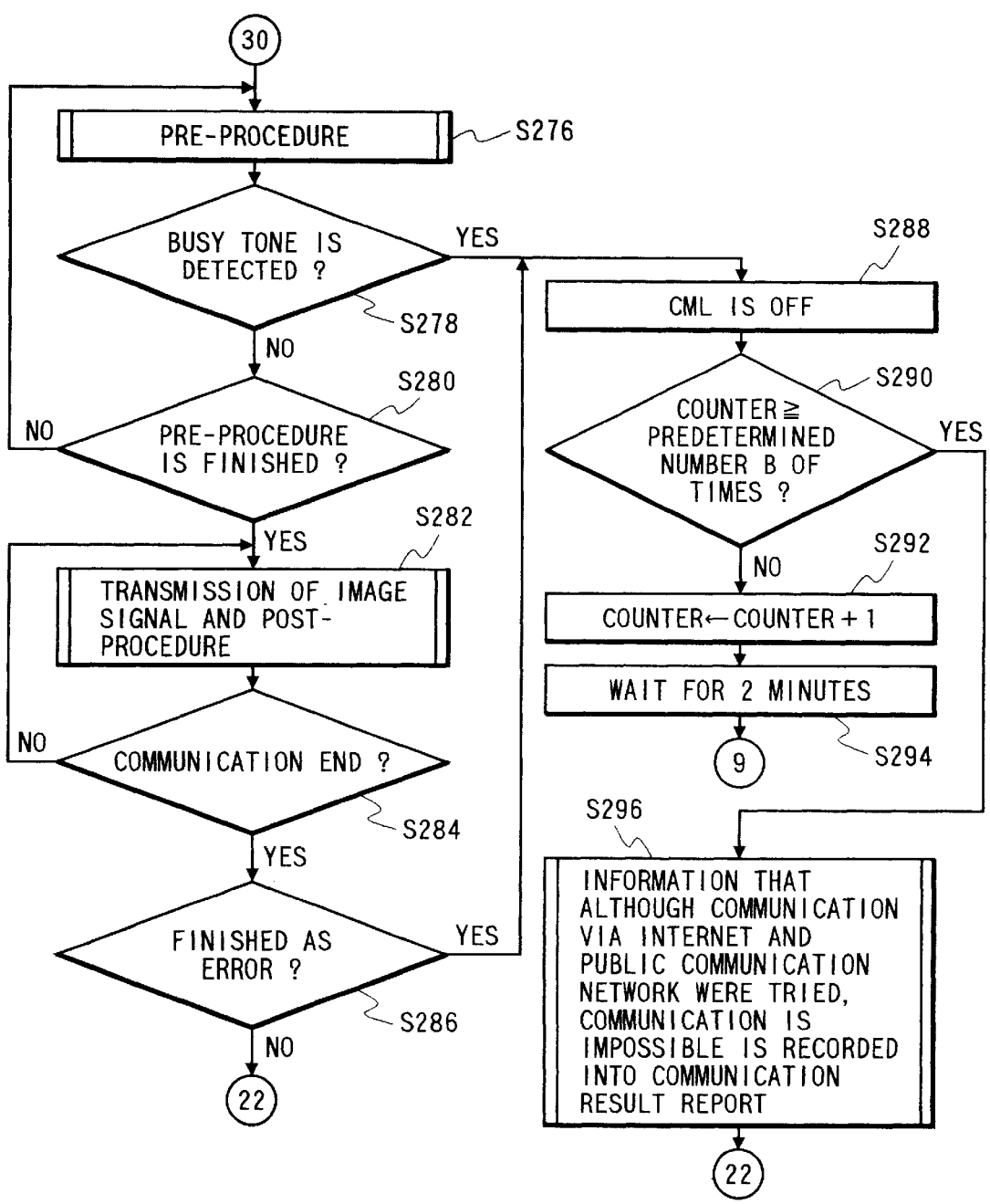
FIG. 19 is a flowchart showing the control operation in the seventh embodiment.

<u>Drawings,</u>
Sheet 17, Fig. 19, "WERE" should read -- WAS --.

<u>Column 1,</u>
Line 55, "swicthed" should read -- switched --.

<u>Column 4,</u>
Line 8, "that" should read -- whether --.
Line 63, "call" should read -- a call --.

<u>Column 7,</u>
Line 35, "∩," should read -- •, --.
Line 42, "an internet" should read -- the Internet --.

<u>Column 10,</u>
Line 21, "an internet" should read -- the Internet --.
Line 39, "tan" should read -- than --.
Line 48, "1 Mbits," should read -- 1 MBit, --.

<u>Column 11,</u>
Line 19, "filed" should read -- tried --.
Line 48, "1 Mbits," should read -- 1 MBit, --.

<u>Column 12,</u>
Line 60, "a-plurality" should read -- a plurality --.

UNITED STATES PATENT AND TRADEMARK OFFICE
CERTIFICATE OF CORRECTION

PATENT NO. : 6,519,247 B1
DATED : February 11, 2003
INVENTOR(S) : Takehiro Yoshida It is certified that error appears in the above-identified patent and that said Letters Patent is hereby corrected as shown below:

<u>Column 17,</u>
Line 34, "An" should read -- A --.

Signed and Sealed this

Fourth Day of November, 2003

JAMES E. ROGAN
*Director of the United States Patent and Trademark Office*